(12) United States Patent
Shukla et al.

(10) Patent No.: US 11,082,808 B1
(45) Date of Patent: Aug. 3, 2021

(54) MULTICAST TRAFFIC MANAGEMENT

(71) Applicant: Amazon Technologies, Inc., Seattle, WA (US)

(72) Inventors: Ashish Kumar Shukla, Milpitas, CA (US); Avinash Joshi, San Jose, CA (US); Binh Tran, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 16/530,289

(22) Filed: Aug. 2, 2019

(51) Int. Cl.
| | |
|---|---|
| *H04L 12/66* | (2006.01) |
| *H04W 4/06* | (2009.01) |
| *H04W 72/04* | (2009.01) |
| *H04L 12/18* | (2006.01) |

(52) U.S. Cl.
CPC ......... *H04W 4/06* (2013.01); *H04W 72/0446* (2013.01); *H04L 12/189* (2013.01)

(58) Field of Classification Search
CPC . H04L 12/1836; H04L 12/189; H04L 1/0002; H04L 1/0017; H04L 1/0026; H04L 1/20; H04L 2001/0093; H04L 29/06; H04L 29/12009; H04L 61/00; H04L 67/322; H04L 67/325; H04L 69/329; H04W 28/12; H04W 72/005; H04W 72/08
See application file for complete search history.

(56) References Cited

U.S. PATENT DOCUMENTS

| | | | | |
|---|---|---|---|---|
| 9,641,987 | B2 * | 5/2017 | Aggarwal | H04W 4/06 |
| 2007/0201413 | A1 * | 8/2007 | Laine | H04L 29/12028 |
| | | | | 370/338 |
| 2007/0230441 | A1 * | 10/2007 | Sethi | H04W 72/005 |
| | | | | 370/352 |
| 2008/0170520 | A1 * | 7/2008 | Sim | H04W 72/005 |
| | | | | 370/310 |
| 2011/0122804 | A1 * | 5/2011 | Iyer | H04L 12/189 |
| | | | | 370/311 |
| 2017/0244769 | A1 * | 8/2017 | Cauduro Dias de Paiva | |
| | | | | H04W 52/0235 |
| 2018/0146423 | A1 * | 5/2018 | Ponnuswamy | H04W 28/18 |

OTHER PUBLICATIONS

LAN/MAN Standards Committee of the IEEE Computer Society, "Part 11: Wireless LAN Medium Access Control (MAC) and Physical Layer (PHY) Specifications," Dec. 7, 2016, pp. 1-3534, IEEE Std 802.11-2016, The Institute of Electrical and Electronics Engineers, Inc., New York, NY, USA.

* cited by examiner

*Primary Examiner* — Phuc H Tran
(74) *Attorney, Agent, or Firm* — Kilpatrick Townsend & Stockton LLP

(57) ABSTRACT

Techniques are described for an unbuffered multicast delivery mode representing the capability of transmitting a multicast frame within a same DTIM interval during which the multicast frame is received. In an example, a network access device determines that a first computing device is in a power saving mode. The network access device receives, during a DTIM interval while the first computing device is in the power saving mode, a multicast frame destined to a multicast MAC address. The network access device determines an association between the multicast MAC address and a device MAC address of a second computing device. The network access device sends, during the DTIM interval and based on the association, the multicast frame to the second computing device.

20 Claims, 12 Drawing Sheets

MULTICAST TRAFFIC MANAGEMENT

BACKGROUND

Internet protocol (IP) multicasting is a method of sending IP datagrams to a group of computing devices in a single transmission, as described in RFC 1112 of the Internet Engineering Task Force (IETF). Typical applications that rely on IP multicasting include media streaming from a source to the group of computing devices.

In a wireless environment, such as in an IEEE 802.11 wireless network, an access point communicates wirelessly with computing devices. When IP multicasting is used, the access point transmits multicast frames to the computing devices. When at least one of the computing devices enters a power saving mode, the access point delays the transmission of the multicast frames to all of the computing devices.

BRIEF DESCRIPTION OF THE DRAWINGS

Various embodiments in accordance with the present disclosure will be described with reference to the drawings, in which.

DETAILED DESCRIPTION

Figure 1:
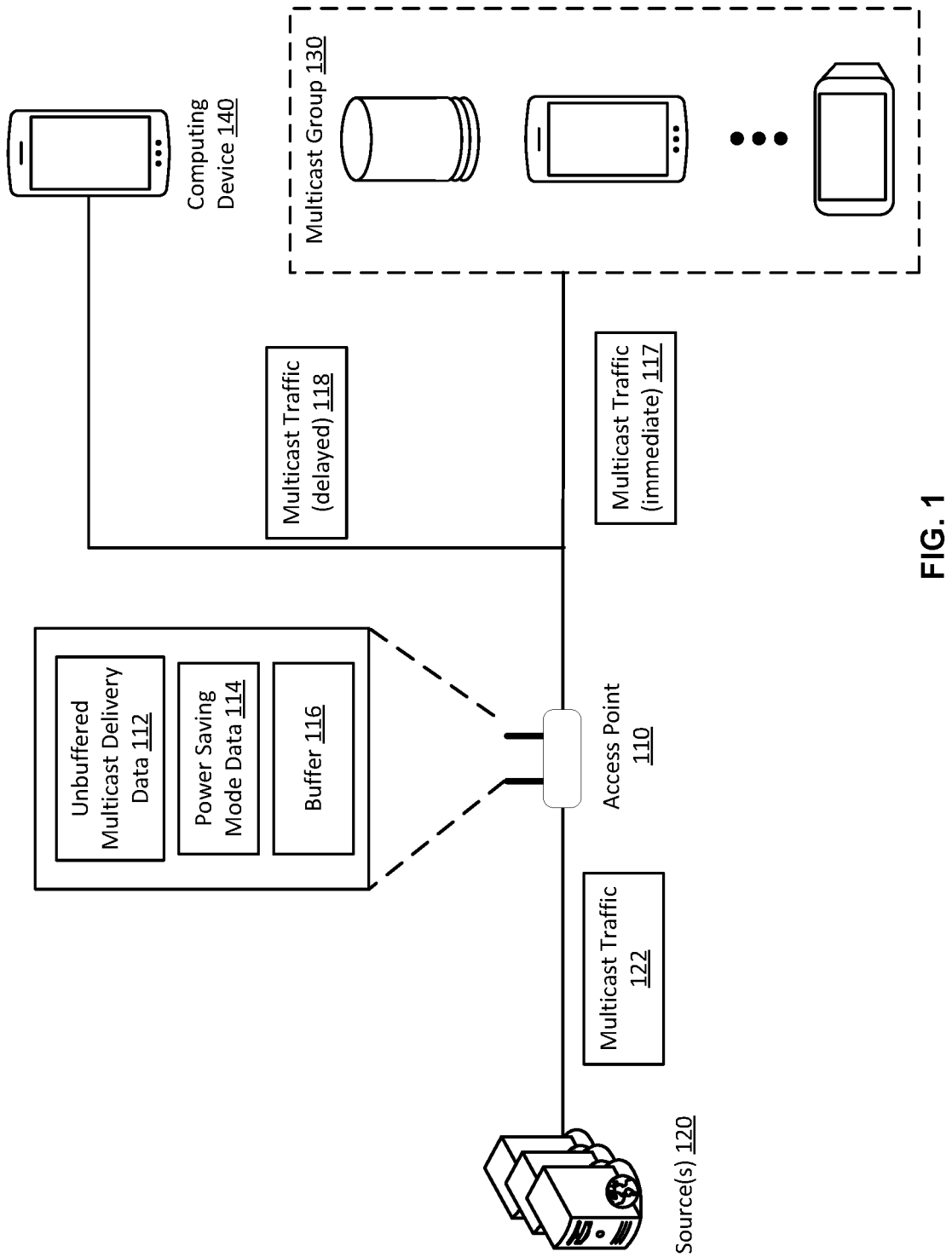
FIG. 1 illustrates an example computing environment for an unbuffered multicast delivery mode according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, an unbuffered multicast delivery mode representing an operational mode in which a device has the capability of transmitting a multicast frame within a same delivery traffic indication map (DTIM) interval during which the multicast frame is received, without any additional delay (e.g., without buffering). In an example, a network access device (e.g., an access point) stores information that represents an association between a first computing device and a multicast MAC address, where the first computing device is communicatively coupled with the network access device. The association indicates that the unbuffered multicast delivery mode is applicable to the first computing device. The first computing device can be part of a group of computing devices that are also associated with the multicast MAC address. A second computing device is also communicatively coupled with the network access device, is not part of the group, and enters a power saving mode. During a DTIM interval and while the second computing device is in the power saving mode, the network access device receives a first multicast frame. Based on a match between a destination of the first multicast frame and stored information representing associations for the unbuffered multicast delivery mode (e.g., the destination is the multicast MAC address), the network access device determines that the first multicast frame is to be transmitted immediately to the group of computing device. Accordingly, the network access device transmits the first multicast frame to the group during the DTIM interval. In comparison, the network access device also receives, during the DTIM interval, a second frame (e.g., also a multicast frame) destined to the second computing device. No match exists between the destination of the second frame and the stored association information. Accordingly, the network access device determines that the transmission of the second multicast should be delayed. As such, the network access device buffers the second frame during the DTIM interval and sends it to the second computing devices in the next DTIM interval.

In addition to storing the information representing associations between groups of computing devices and the multicast MAC address, the network access device can store information representing an association between the multicast MAC address and a counter usable to track the total number of the computing devices from the group in the power saving mode. In particular, when one of these computing devices enters the power saving mode, the network access device increases the counter. Conversely, when one of the computing devices leaves the power saving mode, the network access device decreases the counter. The counter can be used as a further control to manage the unbuffered multicast delivery mode. For instance, when a multicast frame is received during a DTIM interval and is destined to the multicast MAC address, the network access device determines that the unbuffered multicast delivery mode is applicable to the group only if the counter is less than a threshold number. Otherwise, the network access device delays the transmission of the multicast frame until the next DTIM interval.

To illustrate, consider an example of five computing devices and a wireless access point forming a home network. The wireless access point and the five computing devices form a basic service set (BSS). In this example, three of the five computing devices are smart speakers and the remaining two devices are tablets. The wireless access point stores a table (e.g., Table 1 below) that associates the device MAC addresses of the smart speakers (e.g., their hardware MAC addresses) with a multicast MAC address and that tracks the count of smart speakers that are in a power saving mode. The associations stored as informaiton in the table, for example, Table 1, are used to manage the unbuffered multicast delivery mode. The table is referred to herein as a "unbuffered multicast delivery table." For instance, the unbuffered multicast delivery table of this illustrative example may be similar to Table 1:

TABLE 1

| Multicast MAC Address | Device MAC address | Counter |
|---|---|---|
| 01-00-5E-01-02-03 | [02-00-00-01-00-10, 02-00-00-01-00-20, 02-00-00-01-00-30] | 0 |

Continuing with this example, the two tablets are not associated with the unbuffered multicast delivery mode but are registered for IP multicasting. One of the tablets enters a power saving mode and sends a frame to the wireless access point indicating the initiation of the power saving mode. Thereafter, the wireless access point receives multicast frames during a first DTIM interval. A multicast frame represents a frame transmitted according to a multicast protocol, such as by sending the frame in a single transmission to a group of devices associated with a particular multicast MAC address. A first multicast frame is destined to the multicast MAC address. Based on a match with the unbuffered multicast delivery table and the counter being zero, the wireless access point transmits the first multicast frame to the three smart speakers during the first DTIM interval. A second multicast frame is destined to the first tablet in the power saving mode. Because no match exists with the table, the wireless access point buffers the second multicast frame during the first DTIM interval and transmits it to the first tablet during the next DTIM interval. A third multicast frame is destined to the second tablet that is not in the power saving mode. Here, also because no match exists with the table, the wireless access point buffers the third multicast frame during the first DTIM interval and transmits it to the second tablet during the next DTIM interval.

Subsequently, two of the smart speakers enter a power saving mode and each sends a frame indicating the initiation of power saving mode to the wireless access point. In turn, the wireless access point updates the counter to two. Upon receiving a fourth multicast frame destined to the multicast MAC address during a second DTIM interval, the wireless access point determines that the unbuffered multicast delivery mode is no longer applicable to the group of smart speakers because the counter now exceeds a threshold number (e.g., preset to "one"). Accordingly, the wireless access point buffers the fourth multicast frame during the second DTIM interval and transmits it to the group of smart speakers during the next DTIM interval.

Embodiments of the present disclosure provide many technical advantages over existing multicasting systems, including reduced transmission latency, reduced memory usage of a network access device, and reduced power and processing burdens on the computing devices.

To better understand these technical improvements, an overview of existing multicasting techniques are described herein next.

In particular, an application (e.g., a media streaming application) that implements delivery of multicast traffic first registers a specific multicast IPv4 address, that maps to a particular multicast MAC address, which all the stations (STAs) running the same application (e.g., computing devices executing instances of the application) join using IP internet group management protocol (IGMP) procedures. Based on IEEE 802.11 standards, a wireless access point transmits multicast frames after every Nth beacon separated by a DTIM interval, called a DTIM beacon, when at least one of the STAs in the network enters into a power saving mode. In the network, multiple multicast groups may be used, each group for a different purpose. As the number of STAs that are connected to the wireless access point grows (e.g., internet of things (TOT) and mobile devices), any device entering into a power saving mode may necessitate the wireless access point to schedule all subsequent multicast traffic after every DTIM beacon. Hence, multicast traffic to the devices that are awake is delayed. In addition, the wireless access point needs to buffer the multicast traffic in its local memory until after the transmission of the next DTIM beacon. Furthermore, each of the devices in the power saving mode should wake up every DTIM beacon, process the multicast traffic and disregard the multicast frames that are not destined to it.

In comparison, embodiments of the present disclosure can modify the behavior of the wireless access point such that the wireless access point, in some embodiments, does not buffer and delay application specific and latency sensitive multicast traffic. The embodiments also allow the wireless access point to buffer other multicast traffic and schedule the relevant transmission during DTIM beacons. By doing so, the transmission latency is improved for the latency sensitive multicast traffic, while also the amount of buffering by the wireless access point is reduced, and the amount of multicast traffic that a STA needs to process upon waking up is also reduced.

In the interest of clarity of explanation, various embodiments of the present disclosure are described in conjunction with an access point that supports wireless IP multicasting. However, the embodiments are not limited as such and similarly apply to any other type of connections, whether wired or wireless, and to any other type of network access devices. A network access device is generally a transmission device that manages, provides, controls, and/or facilitates access of one or more other computing devices to a computer network including a local area network, a wide area network, and a mesh network. A network hub, a network switch, a network router, an access point, a node in a mesh network, and any combination of such devices are examples of a network access device.

FIG. 1 illustrates an example computing environment for an unbuffered multicast delivery mode according to an embodiment of the present disclosure. As illustrated, the computing environment includes an access point 110, one or more sources 120, a multicast group 130 of computing devices, and a computing device 140. In an example, the access point 110 supports the capability of an unbuffered multicast delivery, whereby a portion of the multicast traffic 122 received from the one or more sources 122 is transmitted immediately (shown as multicast traffic 117 sent to the multicast group 130) and a remaining portion of the multicast traffic 122 is delayed prior to transmission (shown as multicast traffic 118 sent to the computing device 140). Managing the transmission of the multicast traffic 122 to support the capability can involve unbuffered multicast delivery data 112, power saving mode data 114, and a buffer 116 (e.g., a local memory of the access point 110).

In an example, the one or more sources 120 include a computing resource that stores media (e.g., audio and/or video content, files, etc.) and that transmits the media in an IP multicast. For instance, the computing resource is a content server that supports media streaming.

The access point 110 is a wireless access point that manages the wireless access of a computing device to a home network and to a public network, such as the Internet. The wireless access point also receives the multicast traffic 122 (e.g., the streamed media according to IP multicasting) and transmits the multicast traffic 122 to the computing devices on the home network as applicable. The home network includes the access point 110, the computing devices from the multicast group 130, and the computing device 140.

A computing device (e.g., any of the computing devices from the multicast group 130 or the computing device 140) can be a device that includes suitable hardware and software (e.g., one or more processors and one or more memories storing computer-readable instructions) to support IP multicasting. For instance, the computing device can be any of a mobile phone such as a smartphone, a tablet, a laptop, a personal computer, a smart speaker, a smartwatch, a smart appliance, or any other IOT device or user device.

The multicast group 130 is a group of computing devices that are associated with a same multicast MAC address. Multicast traffic destined to the multicast MAC address is sent to the computing devices in the multicast group 130. In other words, a source can send a single multicast frame destined to the multicast MAC address and the access point can send copies, one to each of the computing devices in the multicast group 130.

In an example, the one or more sources 120 streams media by transmitting the multicast traffic 122 to a first multicast MAC address (e.g., 01-00-5E-01-02-03). A streaming application executing on each computing devices of the multicast group 130 is preconfigured to receive and present the media stream by registering for the IP multicasting using the IP IGMP procedure. Similarly, the same one or more sources 120 or a different one(s) can also stream media to a second multicast MAC address (e.g., 01-00-5E-01-02-30). A streaming application executing on the computing device 140 is also preconfigured to receive and present the media stream by registering for the IP multicasting using the IP IGMP procedure.

If the capability for the unbuffered multicast delivery should be available to the computing devices from the multicast group 130, the access point 110 stores the unbuffered multicast delivery data 112 for these devices. In particular, the unbuffered multicast delivery data 112 associates each of the computing devices in the multicast group 130 with the first multicast MAC address. For instance, the association is stored as information in a table, where the first multicast MAC address is one entry and the device MAC address of each of the computing devices is another entry. If the capability for the unbuffered multicast delivery should not be available to the computing device 140, no unbuffered multicast delivery data 112 is stored for the computing device 140.

In addition, the access point 110 stores power saving mode data 114 indicating the computing devices that are in a power saving mode. A power saving mode for a computing device represents a mode of operation in which the computing device uses a relatively smaller amount of power than its normal operational mode. The power saving mode data 114 can also include a count of computing devices that are from the multicast group 130 and that are in a power saving mode. The associations from the unbuffered multicast delivery data 112 and the count from the power saving mode data 114 can be stored as information in the same table. In addition, the unbuffered multicast delivery data 112 and the count from the power saving mode data 114 are used to manage the immediate transmission of the multicast traffic 117 to the computing devices in the multicast group 130 and the computing device 140.

In an example, the computing device 140 enters a power saving mode. Likewise, one of the computing devices from the multicast group 130 enters a power saving mode. The access point 110 updates the power saving mode data 114 to indicate that the computing device 140 and the other computing device are in their respective power saving modes. The access point 110 also updates the count of the computing devices from the multicast group 130 that are in the power saving mode to "one." While the two computing devices are in their respective power saving mode, the one or more sources 120 sends the multicast traffic 122, where a first portion of the multicast traffic 122 is destined to the first multicast MAC address (e.g., 01-00-5E-01-02-03), and where a second portion of the multicast traffic 122 is destined to the second multicast MAC address (e.g., 01-00-5E-01-02-30). The access point 110 receives the two portions, determines that the first portion should be sent to the multicast group 130 given the destination of the first portion, and that the second portion should be sent to the computing device 140 given the destination of the second portion. The access point 110 determines from the unbuffered multicast delivery data 112 that immediate transmission of the first portion is possible. Given that the count is one and is smaller than a predefined threshold number, the access point 110 sends the first portion as the multicast traffic 117 to the multicast group 130 without buffering the first portion in the buffer 116. Given than no unbuffered multicast delivery data is stored for the computing device 140, the access point 110 buffers the second portion in the buffer 116 and sends, as the multicast traffic 118, the second portion from the buffer 116 after an appropriate time delay (e.g., one corresponding to a DTIM interval).

Figure 2:
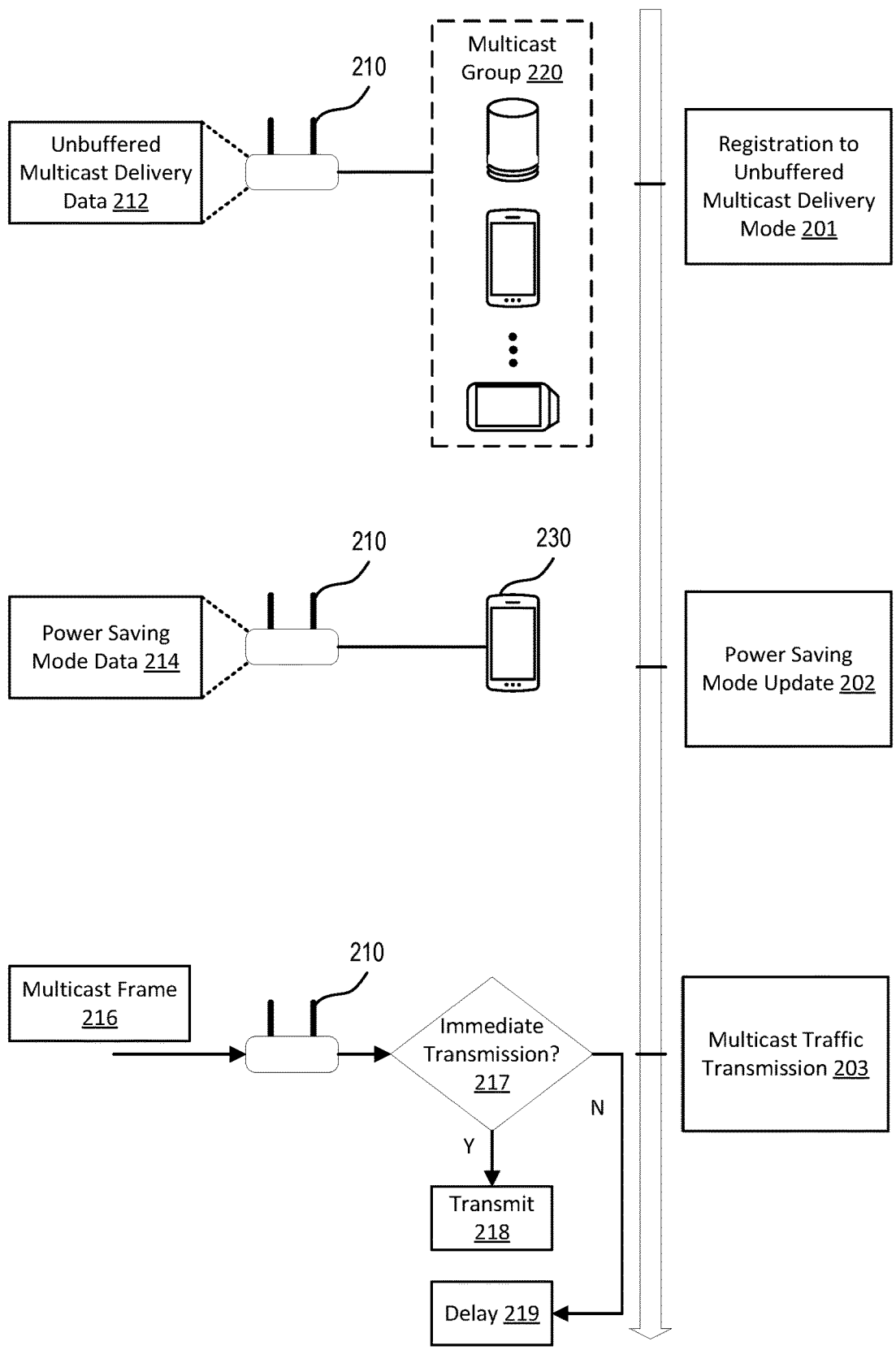
FIG. 2 illustrates example stages for an unbuffered multicast delivery according to an embodiment of the present disclosure.

FIG. 2 illustrates example stages for an unbuffered multicast delivery according to an embodiment of the present disclosure. In an example an access point 210 manages multicast traffic to a multicast group 220 of computing devices in light of a computing device 230 entering a power saving mode. The access point 210 and the multicast group 220 are examples of the access point 110 and the multicast group 130, respectively of FIG. 1. The computing device 230 is an example of any of the computing devices of the multicast group 130 or the computing device 140 of FIG. 1. As illustrated, managing the multicast traffic can be performed in multiple stages, including a first stage 201 for a registration to an unbuffered multicast delivery mode, a second stage 202 for a power saving mode update, and a third stage 203 for transmitting the multicast traffic.

In an example, during the first stage 201, a computing device can join the multicast group 220 and the multicast group 220 can be associated with the unbuffered multicast delivery mode. The multicast group 220 can include a single computing device or multiple computing devices. Different techniques are possible to generate the association and are further described in connection with the next figures. In one example technique, as described in FIG. 6, the access point 210 advertises the capability for the unbuffered multicast delivery and, in turn, the computing device requests this capability. The access point 210 generates and stores unbuffered multicast delivery data 212 indicating that the capability is available to the computing device. In another example technique, as described in FIG. 7, the computing device requests this capability from a backend server and the backend server generates and sends the unbuffered multicast delivery data 212 to the access point 210. In yet another example technique, as described in FIG. 8, no request is made by the computing device. Instead, the access point 210 snoops into IGMP packets to generate and store the unbuffered multicast delivery data 212.

The unbuffered multicast delivery data 212 can be stored as a table that associates a multicast MAC address (e.g., 01-00-5E-01-02-03) with the device MAC address of each of the computing devices in the multicast group (e.g., 02-00-00-01-00-10, 02-00-00-01-00-20, and 02-00-00-01-00-30 for three computing devices). In addition, the table can store a counter that is associated with the multicast MAC address (and/or equivalently with one or more of the device MAC addresses). The counter indicates a total number of computing devices from the multicast group 220 that are in a power saving mode.

During the second stage 202, the computing device 230 sends data to the access point 210 indicating that the computing device 230 has entered a power saving mode. The data can be sent as a frame with a power management bit set to "one" and the access point 210 may respond with an acknowledgment to the computing device 230. In particular, the power management bit can be set in a frame control within a MAC header of the frame. This frame can be a data frame, including for instance a null frame, or a management frame.

If the computing device 230 belongs to the multicast group 220, the access point 210 increases the counter in the table by one. If the computing device 230 does not belong to the multicast group 220, no such increase is made.

Conversely, the computing device 230 may have been in the power saving mode and may exit this mode. In this case, the computing device 230 sends data to the access point 210 indicating that the computing device 230 has exited the power saving mode. The data can be set as a frame with a power management bit set to "zero" and the access point 210 may respond with an acknowledgment to the computing device 230.

Here also, if the computing device 230 belongs to the multicast group 220, the access point 210 decreases the counter in the table by one. If the computing device 230 does not belong to the multicast group 220, no such decrease is made.

During the third stage 203, the access point 210 receives a multicast frame 216. For example, the multicast frame is received during a DTIM interval. During the interval, one or more computing devices are in their respective power saving mode. The access point 210 generates a decision 217 about whether to immediately transmit 218 the multicast frame or to delay 219 the transmission. Immediately transmit 218 represents a transmission of the multicast frame 216 (or, equivalently, a copy thereof) within the DTIM interval. Delay 219 represents buffering the multicast frame 216 in a buffer of the access pint 210 during the DTIM interval and a transmission of the multicast frame 216 within the next DTIM interval. Immediately transmit 218 and delay 219 are further illustrated in FIGS. 4-5.

Various parameters are used to generate the decision. In an example, if the multicast frame 216 is destined to a computing device(s) that does not have an unbuffered multicast delivery data (e.g., no match exists between the destination of the multicast frame 216 and the table), the decision is to delay 219. In an example, if the multicast frame 216 is destined to a computing device(s) that has an unbuffered multicast delivery data (e.g., a match exists between the destination of the multicast frame 216 and the table), the decision can be to immediately transmit 218 or, optionally, can further depend on the associated counter. In particular, consider the example of the multicast frame 216 being destined to the multicast MAC address 01-00-5E-01-02-03 associated with the multicast group 220. Here, a match with the table exists because the table includes the multicast MAC address. If the counter associated with multicast MAC address is less than a predefined threshold number (e.g., "two"), the decision is to immediately transmit 218. Otherwise, the decision is to delay 219.

Figure 3:
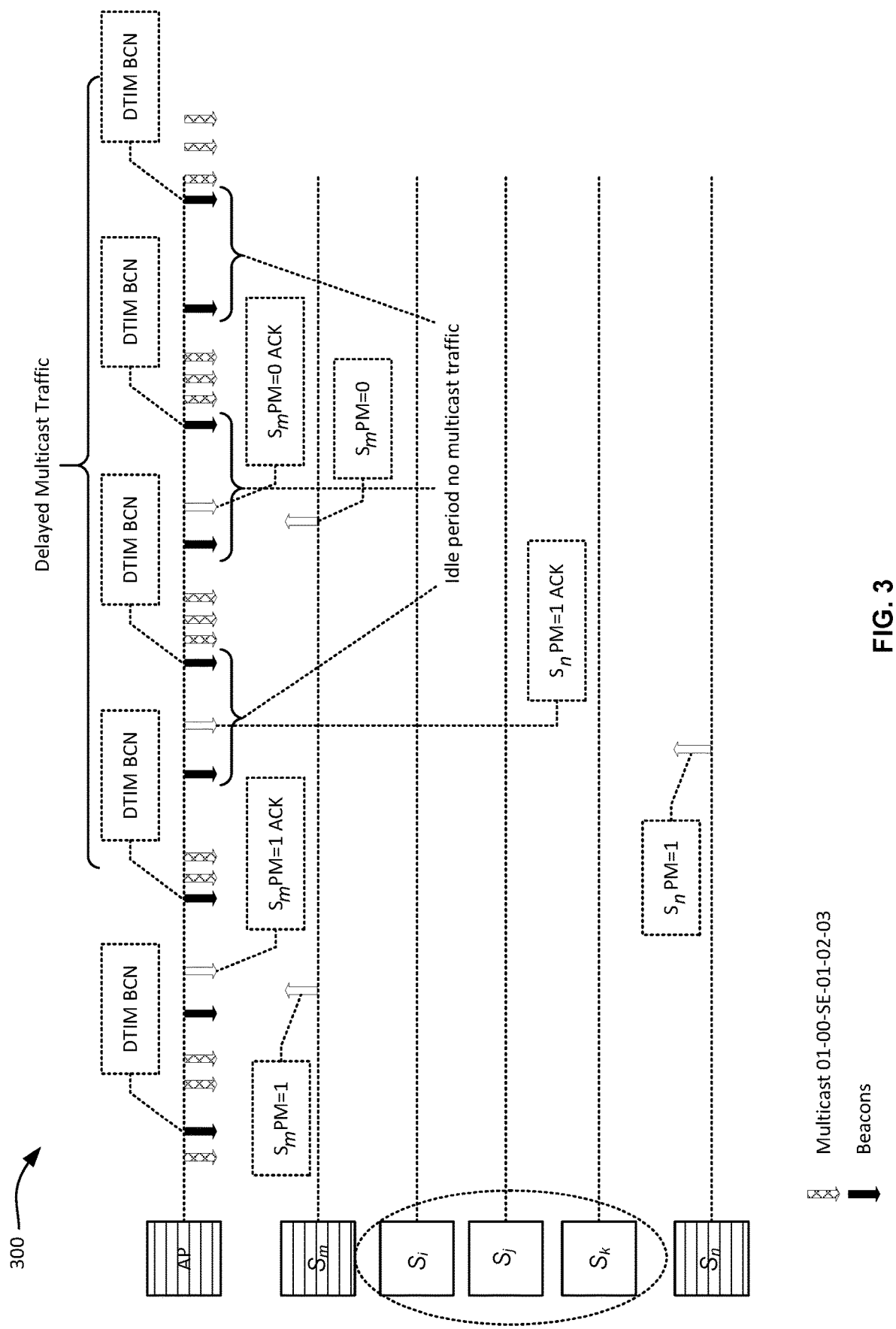
FIG. 3 illustrates a delayed multicast delivery.

FIG. 3 illustrates a delayed multicast delivery 300. As illustrated, an access point "AP" is communicatively coupled with five computing devices, shown as stations "$S_m$," "$S_i$," "$S_j$," "$S_k$," and "$S_n$." The access point AP and the stations $S_m$, $S_i$, $S_j$, $S_k$, and $S_n$ form a basic service set. The three stations $S_i$, $S_j$, and $S_k$ are associated with a multicast MAC address (shown as 01-00-5E-01-02-03) and form a multicast group.

If no station within the basic service set is in power save mode, the access point AP sends multicast frames immediately when they are received by the access point. If there are one or more stations in a power saving mode, the access point AP only transmits multicast frames after each DTIM interval, and transmits at one of the supported rates in the basic rate set. Typically, the DTIM interval is defined as a function of a beacon interval and a DTIM periodicity. The beacon interval is about 100 milliseconds (ms) and the DTIM periodicity is equal to the number of beacon intervals and is unitless. Generally, DTIM periodicity is set to two, resulting in a DTIM interval of 200 ms. Other DTIM intervals can be similarly defined and used. Both beacon interval and DTIM interval are fixed in the access point AP and do not change over period of time. The stations that are awake (e.g., not in a power saving mode) have no control over the behavior of the access point AP and receive multicast traffic after every DTIM interval.

FIG. 3 shows this behavior of the access point AP before and after a station enters a power saving mode. In particular, the station $S_m$ sends a frame to the access point AP at a first point in time, where the frame includes a power management bit set to one (e.g., PM=1 in a frame control). The access point AP responds with an acknowledgment about the station $S_m$ entering the power saving mode. At a second point in time, the station $S_n$ sends a frame to the access point AP, where the frame includes a power management bit set to one. Here also the access point AP responds with an acknowledgment about the station $S_n$ entering the power saving mode. At a third point in time, the station $S_m$ exits its power saving mode and sends a frame to the access point AP including a power management bit set to zero (e.g., PM=0 in a frame control). The access point AP responds with an acknowledgment about the station $S_m$ exiting the power saving mode.

Prior to the first point in time (e.g., prior to the station $S_m$ entering the power saving mode), multicast frames destined to the multicast MAC address 01-00-5E-01-02-03 are immediately sent to the three stations $S_i$, $S_j$, and $S_k$ (e.g., within the same DTIM interval during which the multicast frames are received). After the first point in time, either one or both stations $S_m$ or $S_n$ are in a power saving mode. Accordingly, all subsequent multicast frames are buffered and scheduled for transmission after every DTIM intervals. In this example, the DTIM beacon is 100 ms and the DTIM periodicity is two, resulting in the multicast frames being delayed in 200 ms intervals and 100 ms idle interval where no multicast frames are transmitted.

Although stations $S_i$, $S_j$, and $S_k$ are awake, their multicast frames are delayed as long as at least one of the stations $S_m$ or $S_n$ is in a power saving mode. This results in a latency in the order multiple of beacon intervals (e.g., a minimum of 100 ms). With a large DTIM periodicity or beacon intervals, multicast frames can be lost due to a lack of a large enough buffer in the access point AP, which impacts the capability of meeting quality of service (QoS) requirements.

In addition, the stations $S_m$ and $S_n$ wake up every DTIM interval to receive multicast frames. The stations $S_m$ and $S_n$ also receive and discard multicast frames destined to 01-00-5E-01-02-03. Processing these unwanted multicast frames (e.g., to determine their destination and discard them) results in power wastages on the stations $S_m$ and $S_n$ and adds delay to these $S_m$ and $S_n$ to go back to sleep.

Furthermore, the access point AP needs to buffer multicast frames meant for stations in immediate need of these frames. This wastes access point AP's memory resources that may be used by other traffic, such as for the stations $S_m$ and $S_n$ that are actually in a power saving mode, and that need buffering.

Figure 4:
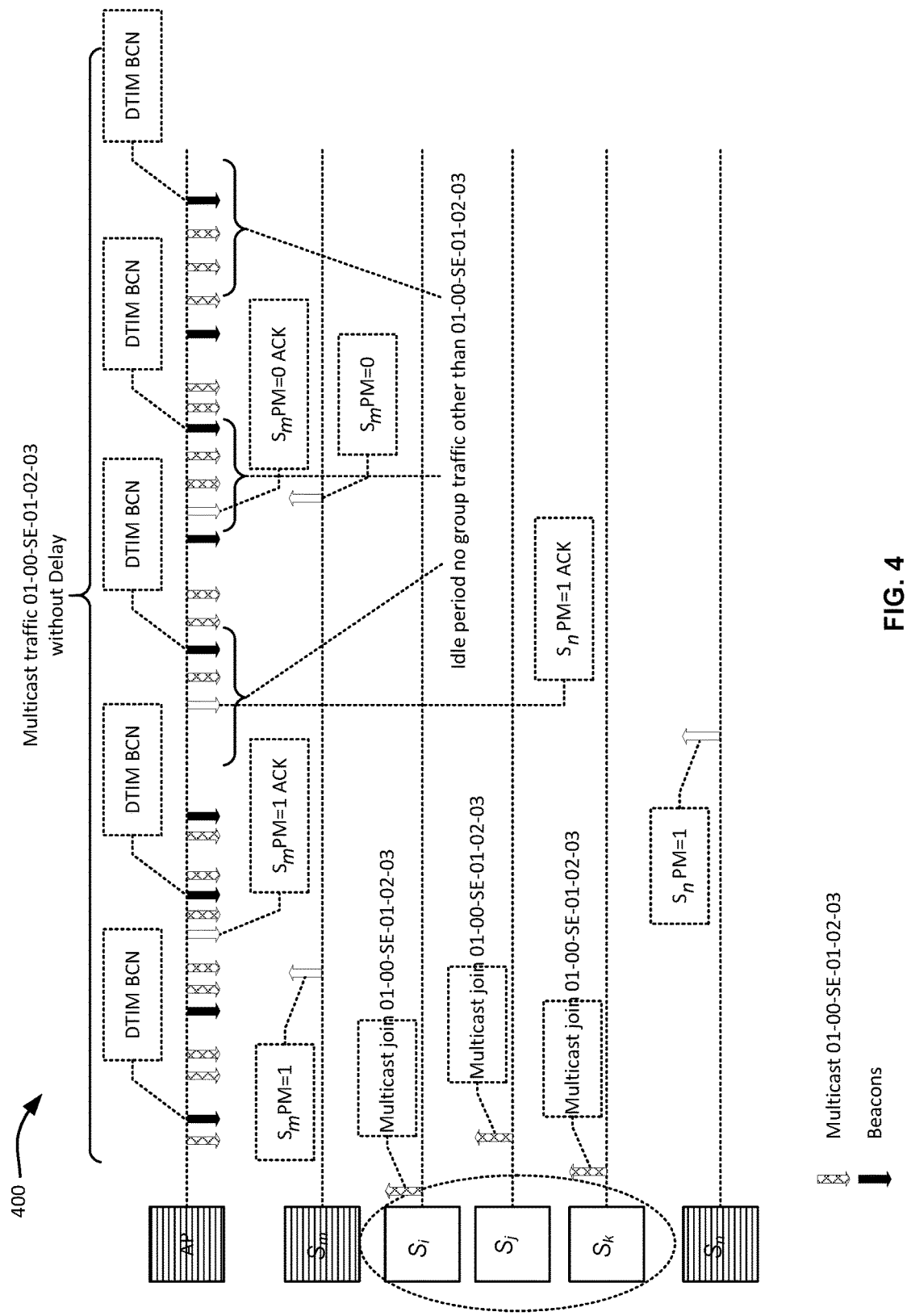
FIG. 4 illustrates an example unbuffered multicast delivery to a group of computing devices in situations where one or more computing devices are in a power saving mode according to an embodiment of the present disclosure.

FIG. 4 illustrates an example unbuffered multicast delivery 400 to a group of computing devices in situations where one or more computing devices are in a power saving mode according to an embodiment of the present disclosure. The unbuffered multicast delivery 400 corresponds to an operational mode that provides technical improvements over the delayed multicast delivery 300 of FIG. 3, including, for example, a reduced latency of transmission, a reduced unwanted processing, and/or a reduced buffering. The technical improvements can be achieved by modifying the behavior of an access point such that the access point does not buffer and delay application-specific and latency-sensitive multicast frames, while still buffering other traffic including other multicast frames schedule the transmissions of this traffic during DTIM intervals.

As illustrated, an access point "AP" is communicatively coupled with five computing devices, shown as stations "$S_m$," "$S_i$," "$S_j$," "$S_k$," and "$S_n$." The access point AP and the stations $S_m$, $S_i$, $S_j$, $S_k$, and $S_n$ form a basic service set. The three stations $S_i$, $S_j$, and $S_k$ are associated with a multicast MAC address (shown as 01-00-5E-01-02-03) and form a multicast group. Here, the three $S_i$, $S_j$, and $S_k$ stations indicate that the unbuffered multicast delivery mode is to be used for their multicast frames (e.g., by sending a registration message to the access point or to a backend server or based on IGMP snooping as described in the next figures), whereby their device MAC addresses are associated with the multicast MAC address. The remaining stations $S_m$ and $S_n$ are configured for the standard multicasting (e.g., by using associations between multicast MAC addresses with reserved multicast address blocks in IPv4 and IPv6, such as 224.0.0/24 and 224.0.1/24, rather than with their device MAC addresses).

FIG. 4 shows this behavior of the access point AP before and after a station enters a power saving mode. In particular, the station $S_m$ sends a frame to the access point AP at a first point in time, where the frame includes a power management bit set to one (e.g., PM=1 in a frame control). The access point AP responds with an acknowledgment about the station $S_m$ entering the power saving mode. At a second point in time, the station $S_n$ sends a frame to the access point AP, where the frame includes a power management bit set to one. Here, also the access point AP responds with an acknowledgment about the station $S_n$ entering the power saving mode. At a third point in time, the station $S_m$ exits its power saving mode and sends a frame to the access point AP including a power management bit set to zero (e.g., PM=0 in a frame control). The access point AP responds with an acknowledgment about the station $S_m$ exiting the power saving mode.

Prior to the first point in time (e.g., prior to the station $S_m$ entering the power saving mode), multicast frames destined to the multicast MAC address 01-00-5E-01-02-03 are immediately sent to the three stations $S_i$, $S_j$, and $S_k$ (e.g., within the same DTIM interval during which the multicast frames are received). After the first point in time, either one or both stations $S_m$ or $S_n$ are in a power saving mode. Here also, multicast frames destined to the multicast MAC address 01-00-5E-01-02-03 are immediately sent to the three stations $S_i$, $S_j$, and $S_k$. In comparison, only multicast frames that are destined to the station $S_m$ or the station $S_n$ are buffered and scheduled for transmission after every DTIM intervals. In other words, the access point AP does not buffer multicast frames destined to the multicast MAC address 01-00-5E-01-02-03 even when at least one of station $S_m$ or $S_n$ is in a power saving mode and these multicast frames are transmitted immediately to the stations $S_i$, $S_j$, and $S_k$. In addition, when any of the stations $S_m$ and $S_n$ wakes up at every DTIM interval, this station $S_m$ or $S_n$ does not receive multicast frames destined to the multicast MAC address 01-00-5E-01-02-03 that would have been otherwise buffered for the station $S_m$ or $S_n$. Accordingly, the stations $S_m$ and $S_n$ can reduce their processing and can go back to sleep faster.

Figure 5:
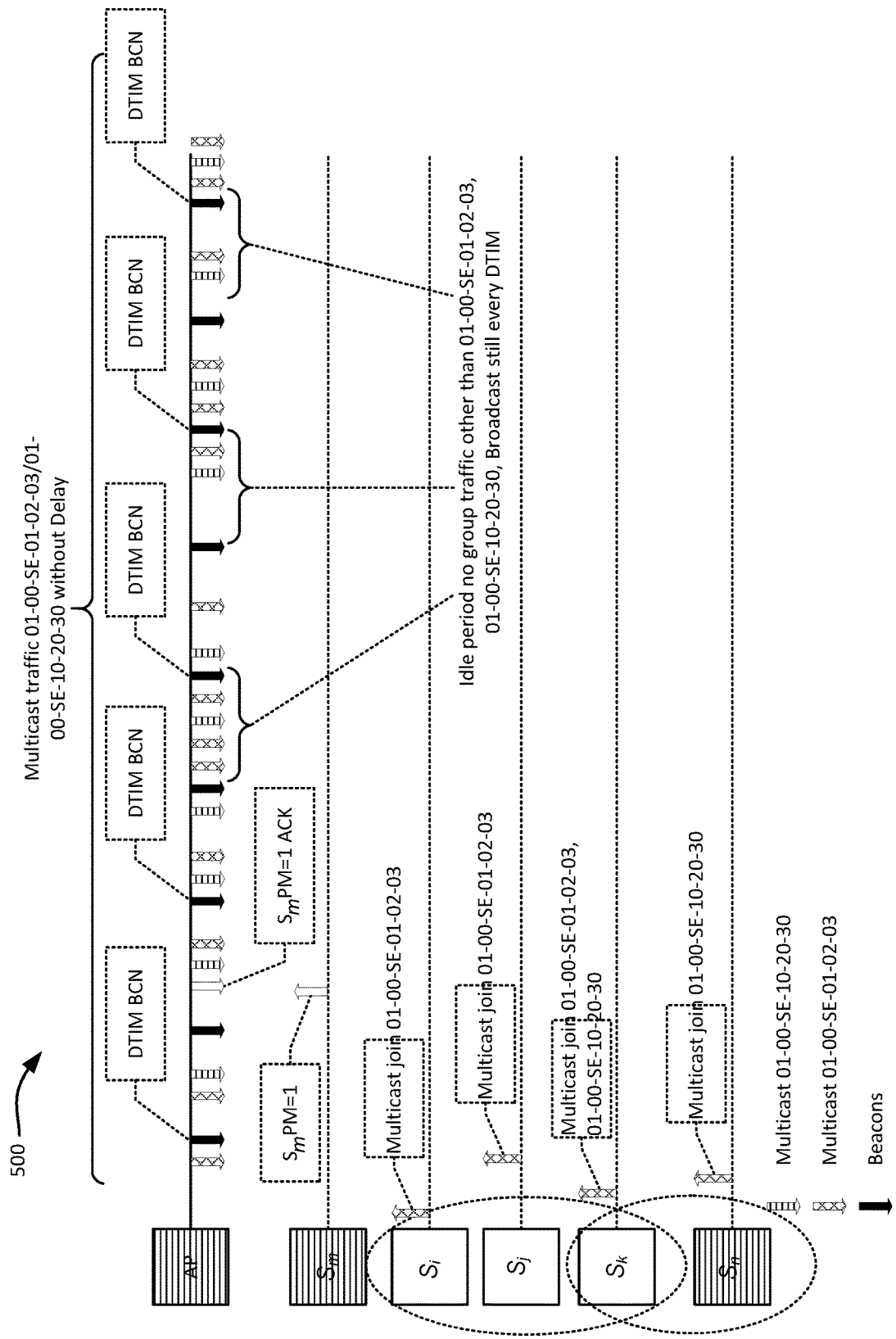
FIG. 5 illustrates another example unbuffered multicast delivery to a group of computing devices in situations where one or more computing devices are in a power saving mode according to an embodiment of the present disclosure.

FIG. 5 illustrates another example unbuffered multicast delivery 500 to a group of computing devices in situations where one or more computing devices are in a power saving mode according to an embodiment of the present disclosure. The unbuffered multicast delivery 500 is similar to unbuffered multicast delivery 400 of FIG. 4. In the illustrative example of FIG. 5, however, two multicast groups are defined and a counter is used to track the total number of computing devices within each group that enters a power saving mode as a further control of the unbuffered multicast delivery 500.

As illustrated, an access point "AP" is communicatively coupled with five computing devices, shown as stations "$S_m$," "$S_i$," "$S_j$," "$S_k$," and "$S_n$." The access point AP and the stations $S_m$, $S_i$, $S_j$, $S_k$, and $S_n$ form a basic service set. The three stations $S_i$, $S_j$, and $S_k$ are associated with a first multicast MAC address (shown as 01-00-5E-01-02-03) and form a first multicast group. Here, the three stations $S_i$, $S_j$, and $S_k$ indicate that the unbuffered multicast delivery mode is to be used for their multicast frames (e.g., by sending a registration message to the access point or to a backend server or based on IGMP snooping as described in the next figures), whereby their device MAC addresses are associated with the first multicast MAC address. Similarly, the two stations $S_k$ and $S_n$ are associated with a second multicast MAC address (shown as 01-00-5E-01-02-30) and form a second multicast group. Here, the two stations $S_k$ and $S_n$ indicate that the unbuffered multicast delivery mode is to be used for their multicast frames (e.g., by sending a registration message to the access point or to a backend server or based on IGMP snooping as described in the next figures), whereby their device MAC addresses are associated with the second multicast MAC address. The stations $S_k$ belongs to the first multicast group and the second multicast group. The remaining station $S_m$ is configured for the standard multicasting (e.g., by using an association between a multicast MAC address with a reserved multicast address block in IPv4 and IPv6, such as 224.0.0/24, rather than with its device MAC address).

To support the unbuffered multicast delivery 500 to the two multicast groups, a table is stored. Table 2 below is an illustrative example.

TABLE 2

| Multicast MAC Address | Device MAC address | Counter |
|---|---|---|
| 01-00-5E-01-02-03 | [02-00-00-01-00-10, 02-00-00-01-00-20, 02-00-00-01-00-30] | 0 |
| 01-00-5E-01-02-30 | [02-00-00-01-00-30, 02-10-20-00-00-10] | 0 |

Each row in the table corresponds to a multicast group and includes three fields. A first field identifies a multicast MAC address. A second field identifies one or more device MAC addresses associated with the multicast MAC address. And a third field represents a counter that identifies the total number of the corresponding station(s) that is(are) in the power saving mode. The counter can be initialized to zero and is updated, as applicable, when the access point AP receives a frame indicating a power management change (e.g., the counter in the first row is increased to one when the station $S_i$ having the 02-00-00-01-00-10 MAC address sends a power management bit set to one, and is decreased by one when this station $S_i$ sends a power management bit set to zero).

The table stores application-specific multicast MAC address membership (e.g., associations between devices MAC addresses of devices executing instances of an application and a multicast MAC address used by the application) and not the standard multicast associations used for the network control. When the access point AP receives a multicast frame for transmission in its BSS, the access point AP performs the lookup into the table and if the multicast MAC address matches, the access point AP transmits the multicast frame without buffering and delay. However, if no match is found, the access point AP buffers and schedules the multicast frame post a DTIM beacon.

When the access point AP receives a frame from a station that has a power management bit in a frame control set to one, the access point AP determines whether a match exists between the station's MAC address and the table. If the station is part of any multicast group, the access point AP increments the corresponding counter. Conversely, this field is decremented when the access point AP receives a frame that has a power management bit in a frame control set to zero. If the total number of stations that belong to a multicast group and that are in a power saving mode exceeds a predefined threshold number (e.g., a value configured as an access point setting), the access point AP starts delaying the multicast frames destined to that group every DTIM interval similarly to the delayed multicast delivery 300 of FIG. 3. Otherwise, the multicast frames are immediately transmitted to the multicast group similarly to unbuffered multicast delivery 400 of FIG. 4. The counter and the predefined threshold number allow the access point AP and applications on the stations to stop using multicast, due to additional delay, should such stations start sleeping, for example, when running on low battery or upon a network scan. In other words, the access point AP can change the delivery mode and fallback to the delayed multicast delivery to reliably transmit multicast frames to sleeping stations because, otherwise, the wireless access point may not buffer multicast frames while these stations are sleeping and these stations may not receive the multicast frames that were transmitted while being in the power saving mode.

As illustrated, the station $S_m$ sends a frame to the access point AP at a first point in time, where the frame includes a power management bit set to one (e.g., PM=1 in a frame control). The access point AP responds with an acknowledgment about the station $S_m$ entering the power saving mode. Because no match exists between the station $S_m$'s device MAC address and the table, no counter is updated. Multicast frames destined to the first and second multicast MAC addresses are immediately transmitted to both multicast groups, whereas multicast frames destined to the station $S_m$ are buffered.

In another illustration, assume that the threshold number is predefined as two. In this illustration, the stations $S_k$ and $S_n$ are both in a power saving mode after a particular point in time, whereas the stations $S_i$ and $S_j$ are not. Accordingly, the first counter in the first row of the table is updated to one and the second counter in the second row of the table is updated to two. Because the first counter (one) is less than the threshold number (two), multicast frames destined to the first multicast group are immediately transmitted to the first multicast group. In comparison, because the second counter (two) is not less than (e.g., equal to or larger than) the threshold number (two), multicast frames destined to the second multicast group are buffered and scheduled for transmission after every DTIM interval.

Figure 6:
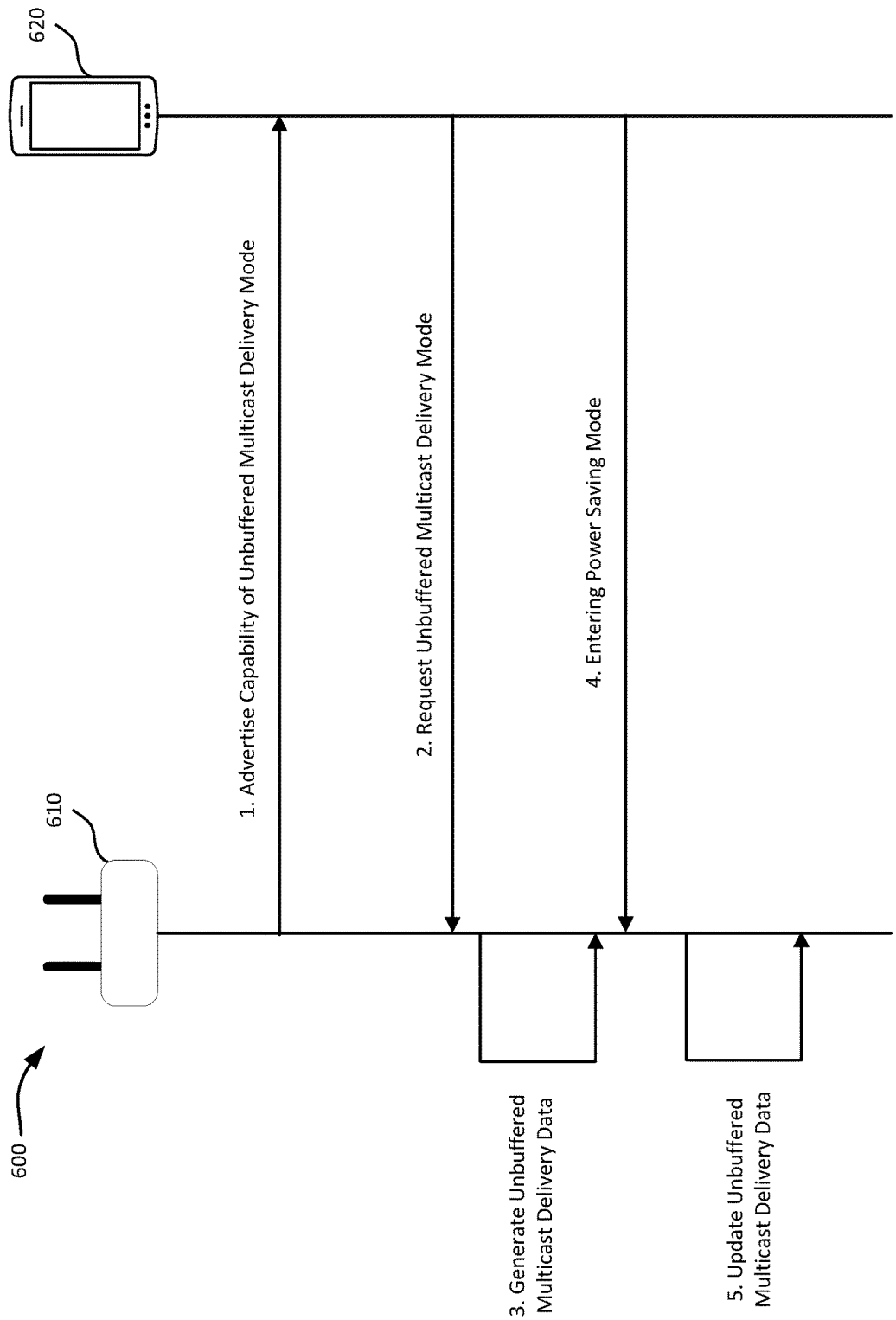
FIG. 6 illustrates an example sequence diagram for generating and updating unbuffered multicast delivery data according to an embodiment of the present disclosure.

FIG. 6 illustrates an example sequence diagram for generating and updating unbuffered multicast delivery data according to an embodiment of the present disclosure. As illustrated, the sequence diagram 600 includes a plurality of sequence steps performed by an access point 610 and a computing device 620 that are communicatively coupled.

As illustrated, in a first sequence step of the sequence diagram 600, the access point 610 advertises its capability of an unbuffered multicast delivery mode. In particular, the access point sends (e.g., broadcasts) data indicating this capability, where the data is received by the computing device 620. For example, the data is sent in a beacon frame and includes a vendor element. The vendor element includes a first field that indicates the capability. The vendor element also includes a second field that indicates a threshold number associated with using the unbuffered multicast delivery mode (e.g., if a total number of computing devices that are part of a multicast group is less than the threshold number, the unbuffered multicast delivery mode is provided to computing devices of the multicast group; otherwise, a delayed multicast delivery mode is provided to the computing devices of the multicast group).

In an illustration, the beacon frame includes multiple fields as follows:

| Element ID | Length | Information field | |
|---|---|---|---|
| 221 | n | organizationally unique identifier (OUI) | Vendor-specific content |

The element ID field is one octet. The length field is one octet. The OUI field is three octets. And the vendor-specific content field is three octets.

The vendor-specific content corresponds to the vendor element and includes a capability field and a threshold number field as follows:

| ID | Protocol Specific content [type-length-values (TLVs)] (2) | |
|---|---|---|
| (1) | Sub-ID | Description |
| | 2 | Unbuffered multicast delivery. When set to one, the access point would not buffer selected multicast traffic, when a station that is not part of a multicast group enters into a power saving mode. When set to zero, the access point sends multicast traffic after DTIM beacon when the station enters into the power saving mode. All other values reserved. |
| | 3 | Threshold number. When set to zero, the access point starts using DTIM beacon multicast scheduling, when any station part of a particular multicast group enters into a power saving mode. When set to "N," the access point uses the unbuffered multicast delivery as long as number of stations in the multicast group that have entered the power saving mode is less than "N." |

Each of the two fields is one octet. This vendor element in the beacon frame helps the computing device 620 learning about the access point's 610 capability before applications running on the computing device 610 choose to use multicast-based content delivery. For example, an application may only use multicast delivery if the access point 610 supports the unbuffered multicast delivery mode; otherwise, the application may either use unicast or multicast to unicast conversion scheme. Other types of frames are similarly usable to advertise the capability of the unbuffered multicast delivery mode. For instance, the above vendor element can be additionally or alternatively included in a probe response frame, an authentication response frame, and/or an association response frame.

In a second sequence step of the sequence diagram 600, the computing device 620 requests the capability of the unbuffered multicast delivery mode from the access point 620. In particular, the computing device 620 receives the beacon frame and sends, in addition to IGMP multicast frames a vendor action frame to the access point 610. The vendor action frame includes an IGMP payload indicating a request to associate (e.g., bind) a multicast MAC address with a device MAC address of the computing device 620. In this way, the access point 610 determines whether multicast frames destined to the computing device 620 (or to a specific instance of an application executing on the computing device 620) is latency sensitive and not meant to be delayed when some other computing device enters into a power saving mode or is already into the power saving mode. The application-specific multicast frames (e.g., IPv4 multicast 234/8, 239/8) are categorized as latency sensitive while standard IPv4 multicast frames (destined to 224.0.0/24, 224.0.1/24) are scheduled every DTIM beacons when another computing device enters or is in the power saving mode. Other types of frames are similarly usable to request the capability of the unbuffered multicast delivery mode. For instance, a similar payload can be additionally or alternatively included in a probe request frame, an authentication request frame, and/or an association request frame.

In a third sequence step of the sequence diagram 600, the access point 610 generates unbuffered multicast delivery data. The unbuffered multicast delivery data represents data that binds the multicast MAC address and the device MAC address, such that multicast traffic destined to the multicast MAC address (e.g., having the multicast MAC address as the receiver address in a multicast header of a multicast frame) can be transmitted to the device. In particular, the unbuffered multicast delivery data associates the multicast MAC access with the device MAC address and, optionally, with a counter of computing devices that are associated with the same multicast MAC address and that are in a power saving mode. For example, the unbuffered multicast delivery data is generated and stored in a table. Table 3 below is an illustrative example.

TABLE 3

| Multicast MAC Address | Device MAC address | Counter |
|---|---|---|
| 01-00-5E-01-02-03 | [02-00-00-01-00-10, 02-00-00-01-00-20, 02-00-00-01-00-30] | 0 |

01-00-5E-01-02-03 is the multicast MAC address for a multicast group. 02-00-00-01-00-10 is the device MAC address of the computing device 620. 02-00-00-01-00-20 and 02-00-00-01-00-30 are device MAC addresses of two other computing devices in the multicast group. The counter is zero indicating that none of the three devices in the multicast group are in a power saving mode.

Although a device MAC address is shown in the table (and, more generally, in the unbuffered multicast delivery data), the embodiments of the present disclosure are not limited as such. Instead, any other identifier of a device can be used. Such an identifier can be different from a reserved IPv4 or IPv6 multicast address.

In a fourth sequence step of the sequence diagram 600, the computing device 620 sends data to the access point 610, where the data indicates that the computing device 620 has entered a power saving mode. For example, the computing device 620 sends a frame to the access point 610, where the frame includes a power management bit set to one (e.g., PM=1 in a frame control). The access point 610 responds with an acknowledgment about the computing device 620 entering the power saving mode. Conversely, when the computing device 620 exits its power saving mode, the computing device 620 sends a frame to the access point 610 including a power management bit set to zero (e.g., PM=0 in a frame control). The access point 610 responds with an acknowledgment about the computing device 620 exiting the power saving mode.

In a fifth sequence step of the sequence diagram 600, the access point updates the unbuffered multicast delivery data based on the data about the power saving mode received from the computing device. For example, when the access point 610 receives a frame from the computing device 610 that has a power management bit set to one in a frame control, the access point 610 determines whether a match exists between the device MAC address of the computing device 620 and the table. If a match exists, the access point 610 increments the corresponding counter. Conversely, this field is decremented when the access point 610 receives a frame from the computing device 620 that has a power management bit set to zero in a frame control and when a match with the table exists.

Figure 7:
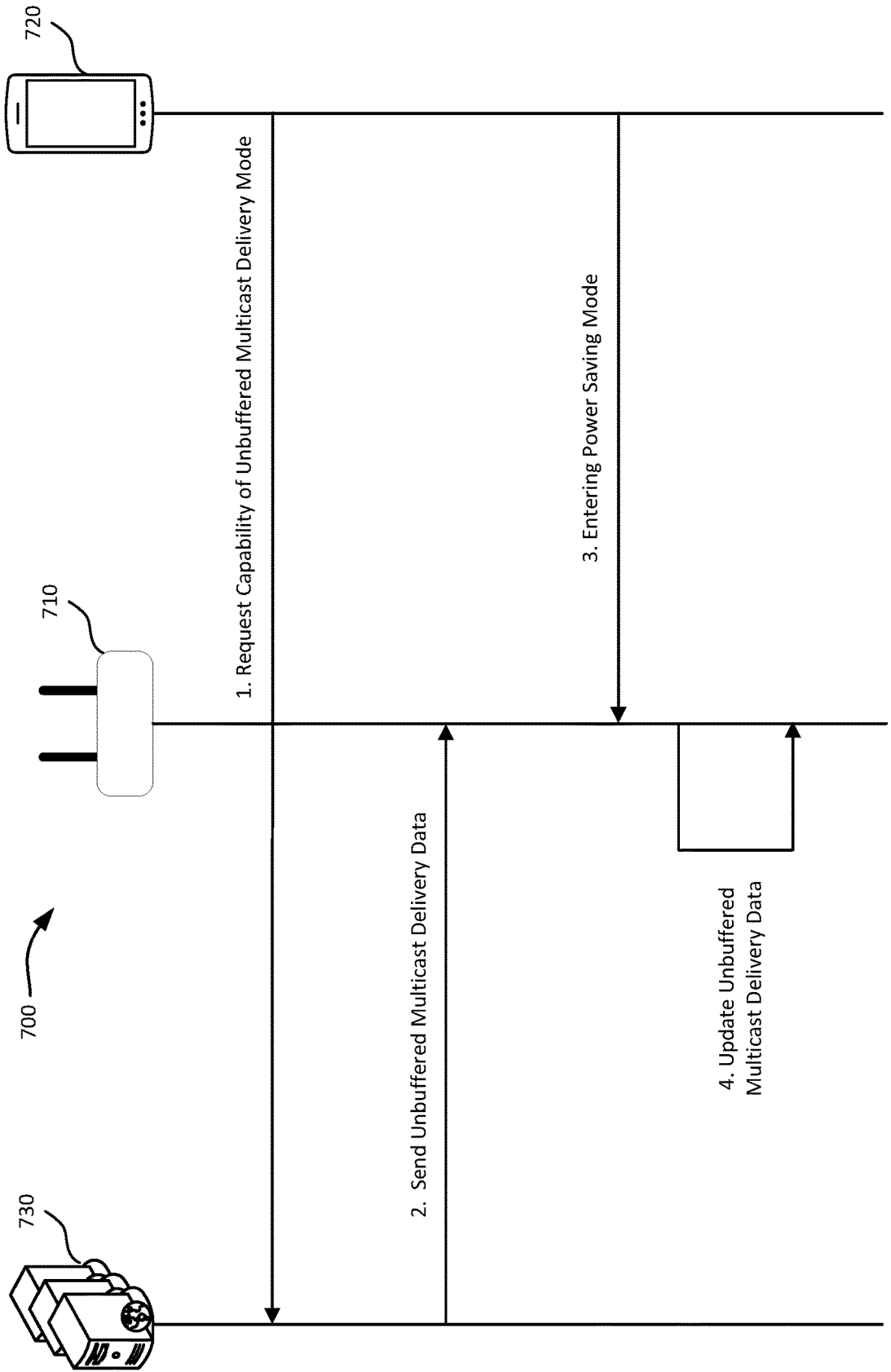
FIG. 7 illustrates another example sequence diagram for generating and updating unbuffered multicast delivery data according to an embodiment of the present disclosure.

FIG. 7 illustrates another example sequence diagram 700 for generating and updating unbuffered multicast delivery data according to an embodiment of the present disclosure. Unlike the sequence diagram 600 of FIG. 6, here an access point 710 does not advertise its capability of an unbuffered multicast delivery mode to a computing device 720. Instead, the computing device 720 requests such a capability from a backend system 730 (e.g., an endpoint hosted on a computing cloud) and the backend system 730 sends (e.g., in a push mechanism) unbuffered multicast delivery data and updates thereto to the access point 710. Over time, the access point 710 updates the unbuffered multicast delivery data (e.g., any counter) based on data that is received from the computing device 720 and that indicates entry into or exit from a power saving mode. The access point 710, the computing device 720, and the backend system 730 are communicatively coupled.

As illustrated, in a first sequence step of the sequence diagram 700, the computing device 720 requests the capability of the unbuffered multicast delivery mode from the backend system. For example, the computing device 720 sends a message indicating a request to bind a multicast MAC address with a device MAC address of the computing device 720. In this way, the backend system 730 determines whether multicast frames destined to the computing device 720 (or to a specific instance of an application executing on the computing device 720) are latency sensitive and not meant to be delayed when some other computing device enters into a power saving mode or is already into the power saving mode.

In a second sequence step of the sequence diagram 700, the backend system 730 generates and sends unbuffered multicast delivery data to the access point 710. For example, the unbuffered multicast delivery data associates the multicast MAC access with the device MAC address and is sent in a push to the access point 710. Over time, if an update is made to the unbuffered multicast delivery data (e.g., another computing device (or application) joins or leaves the multicast group), such an update can also be pushed to the access point 710. Further, the access point 710 can add a counter to the unbuffered multicast delivery data, where the counter indicates a total number of computing devices that are associated with the same multicast MAC address and that are in a power saving mode. The access point 710 stores the unbuffered multicast data. For example, the unbuffered multicast delivery data is stored in a table. Table 4 below is an illustrative example.

TABLE 4

| Multicast MAC Address | Device MAC address | Counter |
| --- | --- | --- |
| 01-00-5E-01-02-03 | [02-00-00-01-00-10, 02-00-00-01-00-20, 02-00-00-01-00-30] | 0 |

01-00-5E-01-02-03 is the multicast MAC address for a multicast group. 02-00-00-01-00-10 is the device MAC address of the computing device 720. 02-00-00-01-00-20 and 02-00-00-01-00-30 are device MAC addresses of two other computing devices in the multicast group. The counter is zero indicating that none of the three devices in the multicast group are in a power saving mode.

Although a device MAC address is shown in the table (and, more generally, in the unbuffered multicast delivery data), the embodiments of the present disclosure are not limited as such. Instead, any other identifier of a device can be used. Such an identifier can be different from a reserved IPv4 or IPv6 multicast address.

In a third sequence step of the sequence diagram 700, the computing device 720 sends data to the access point 710, where the data indicates that the computing device 720 has entered a power saving mode. For example, the computing device 720 sends a frame to the access point 710, where the frame includes a power management bit set to one (e.g., PM=1 in a frame control). The access point 710 responds with an acknowledgment about the computing device 720 entering the power saving mode. Conversely, when the computing device 720 exits its power saving mode, the computing device 720 sends a frame to the access point 710 including a power management bit set to zero (e.g., PM=0 in a frame control). The access point 710 responds with an acknowledgment about the computing device 720 exiting the power saving mode.

In a fourth sequence step of the sequence diagram 700, the access point 710 updates the unbuffered multicast delivery data based on the data about the power saving mode received from the computing device. For example, when the access point 710 receives a frame from the computing device 710 that has a power management bit set to one in a frame control, the access point 710 determines whether a match exists between the device MAC address of the computing device 720 and the table. If a match exists, the access point 710 increments the corresponding counter. Conversely, this field is decremented when the access point 710 receives a frame from the computing device 720 that has a power management bit set to zero in a frame control and when a match with the table exists.

Figure 8:
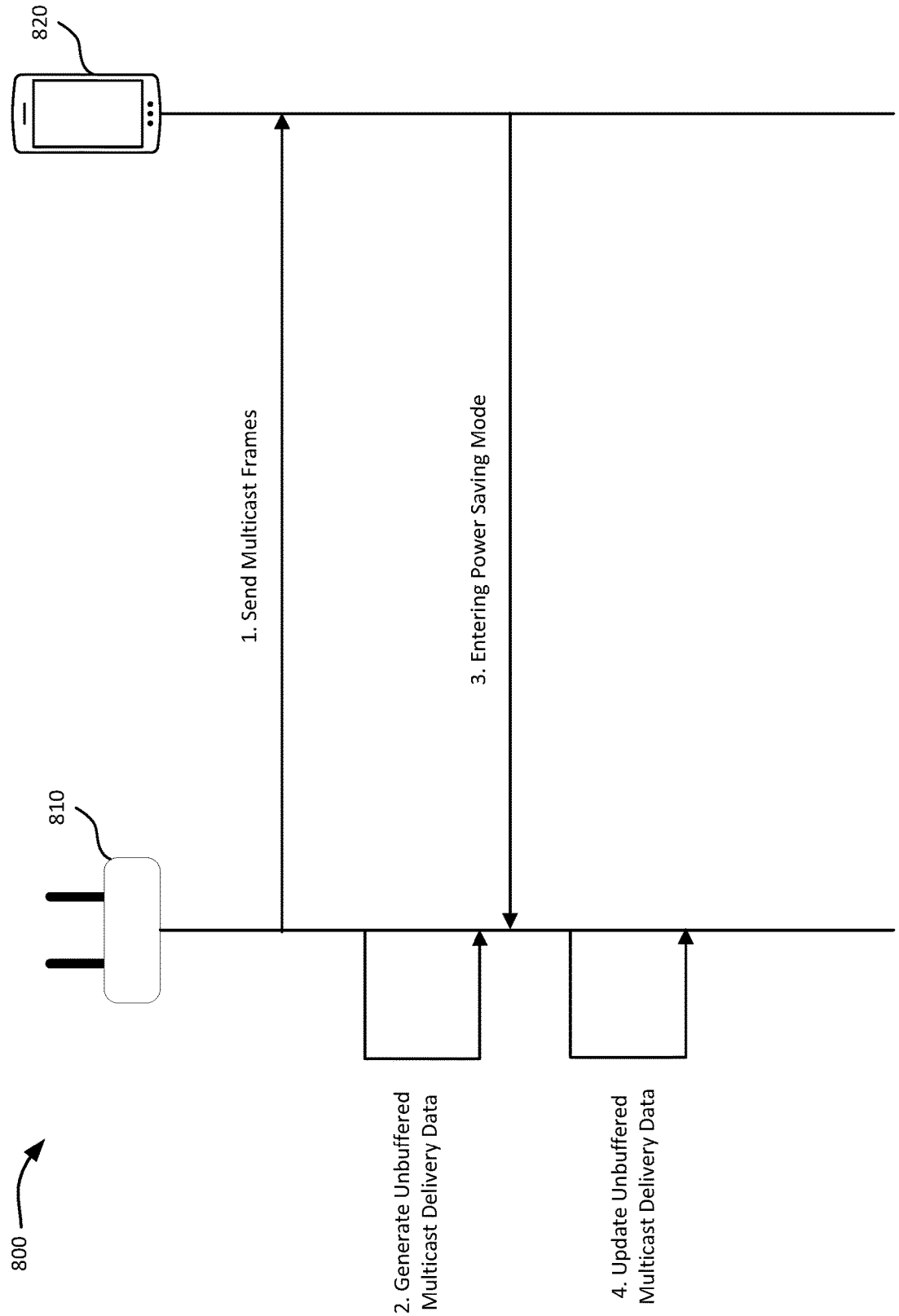
FIG. 8 illustrates yet another example sequence diagram for generating and updating unbuffered multicast delivery data according to an embodiment of the present disclosure.

FIG. 8 illustrates yet another example sequence diagram 800 for generating and updating unbuffered multicast delivery data according to an embodiment of the present disclosure. Unlike the sequence diagram 600 of FIG. 6, here an access point 810 does not advertise its capability of an unbuffered multicast delivery mode to a computing device 820. Also, the sequence diagram 700 of FIG. 7, no backend system is used. Instead, the access point determines, by performing IGMP snooping, that an unbuffered multicast delivery mode should be provided to the computing device 820 as part of a multicast group (where this group can include one or more computing devices). The access point 810 and the computing device 820 are communicatively coupled.

As illustrated, in a first sequence step of the sequence diagram 800, the access point 610 sends multicast frames to the computing device 820. For example, the multicast frames are copies of multicast frames received from a source, where the source uses a multicast MAC address to stream media content to an instance of an application executing on the computing device 820.

In a second sequence step of the sequence diagram 800, the access point generates and stores unbuffered multicast delivery data. The unbuffered multicast delivery data associates the multicast MAC access with the device MAC address and, optionally, with a counter of computing devices that are associated with the same multicast MAC address and that are in a power saving mode. In an example, the association between multicast MAC access with the device MAC address is generated based on IGMP snooping. IGMP snooping includes of listening to IGMP network traffic to control transmission of IP multicast frames. The counter is initialized to zero. The unbuffered multicast delivery data can be stored in a table. Table 5 below is an illustrative example.

TABLE 5

| Multicast MAC Address | Device MAC address | Counter |
| --- | --- | --- |
| 01-00-5E-01-02-03 | [02-00-00-01-00-10, 02-00-00-01-00-20, 02-00-00-01-00-30] | 0 |

01-00-5E-01-02-03 is the multicast MAC address for a multicast group. 02-00-00-01-00-10 is the device MAC address of the computing device 820. 02-00-00-01-00-20 and 02-00-00-01-00-30 are device MAC addresses of two other computing devices in the multicast group. The counter is zero indicating that none of the three devices in the multicast group are in a power saving mode.

Although a device MAC address is shown in the table (and, more generally, in the unbuffered multicast delivery data), the embodiments of the present disclosure are not limited as such. Instead, any other identifier of a device can be used. Such an identifier can be different from a reserved IPv4 or IPv6 multicast address.

In a third sequence step of the sequence diagram 800, the computing device 820 sends data to the access point 810, where the data indicates that the computing device 820 has entered a power saving mode. For example, the computing device 820 sends a frame to the access point 810, where the frame includes a power management bit set to one (e.g., PM=1 in a frame control). The access point 810 responds with an acknowledgment about the computing device 820 entering the power saving mode. Conversely, when the computing device 820 exits its power saving mode, the computing device 820 sends a frame to the access point 810 including a power management bit set to zero (e.g., PM=0 in a frame control). The access point 810 responds with an acknowledgment about the computing device 820 exiting the power saving mode.

In a fourth sequence step of the sequence diagram 800, the access point 810 updates the unbuffered multicast delivery data based on the data about the power saving mode received from the computing device. For example, when the access point 810 receives a frame from the computing device 810 that has a power management bit set to one in a frame control, the access point 810 determines whether a match exists between the device MAC address of the computing device 820 and the table. If a match exists, the access point 810 increments the corresponding counter. Conversely, this field is decremented when the access point 810 receives a frame from the computing device 820 that has a power management bit set to zero in a frame control and when a match with the table exists.

Figure 9:
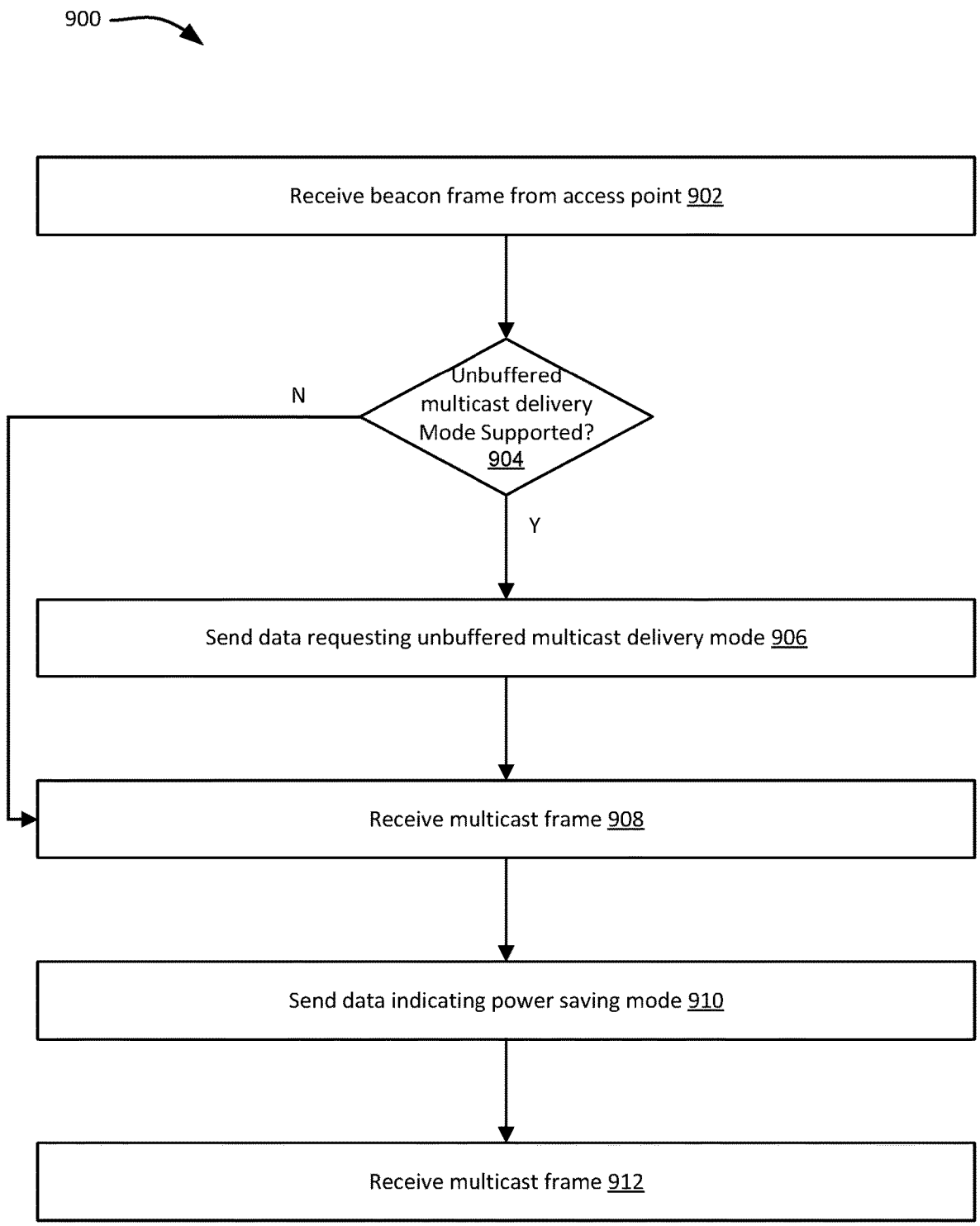
FIG. 9 illustrates an example flow of a computing device requesting an unbuffered multicast delivery according to an embodiment of the present disclosure.
Figure 10:
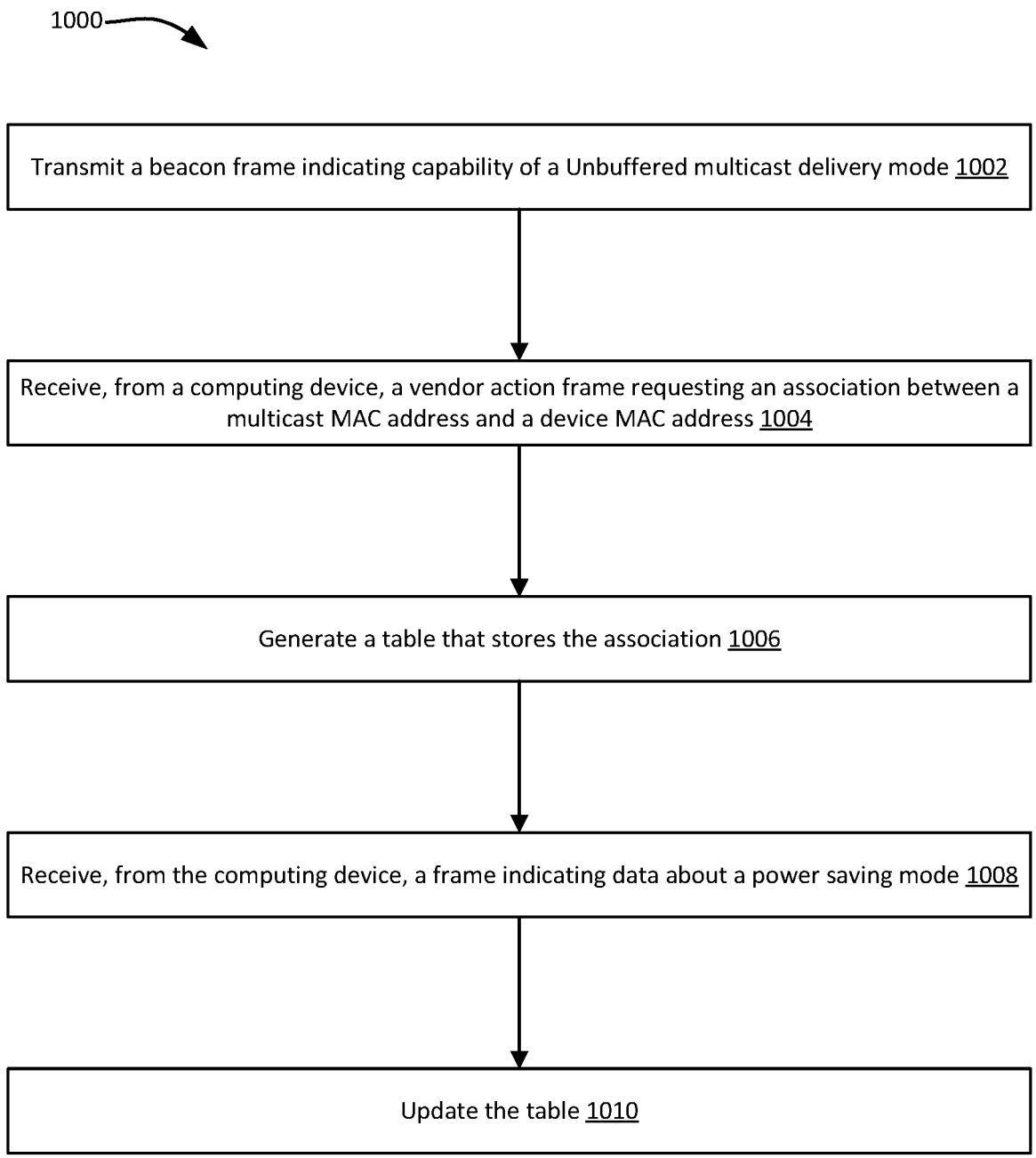
FIG. 10 illustrates an example flow of an access point generating and updating unbuffered multicast delivery data according to an embodiment of the present disclosure.
Figure 11:
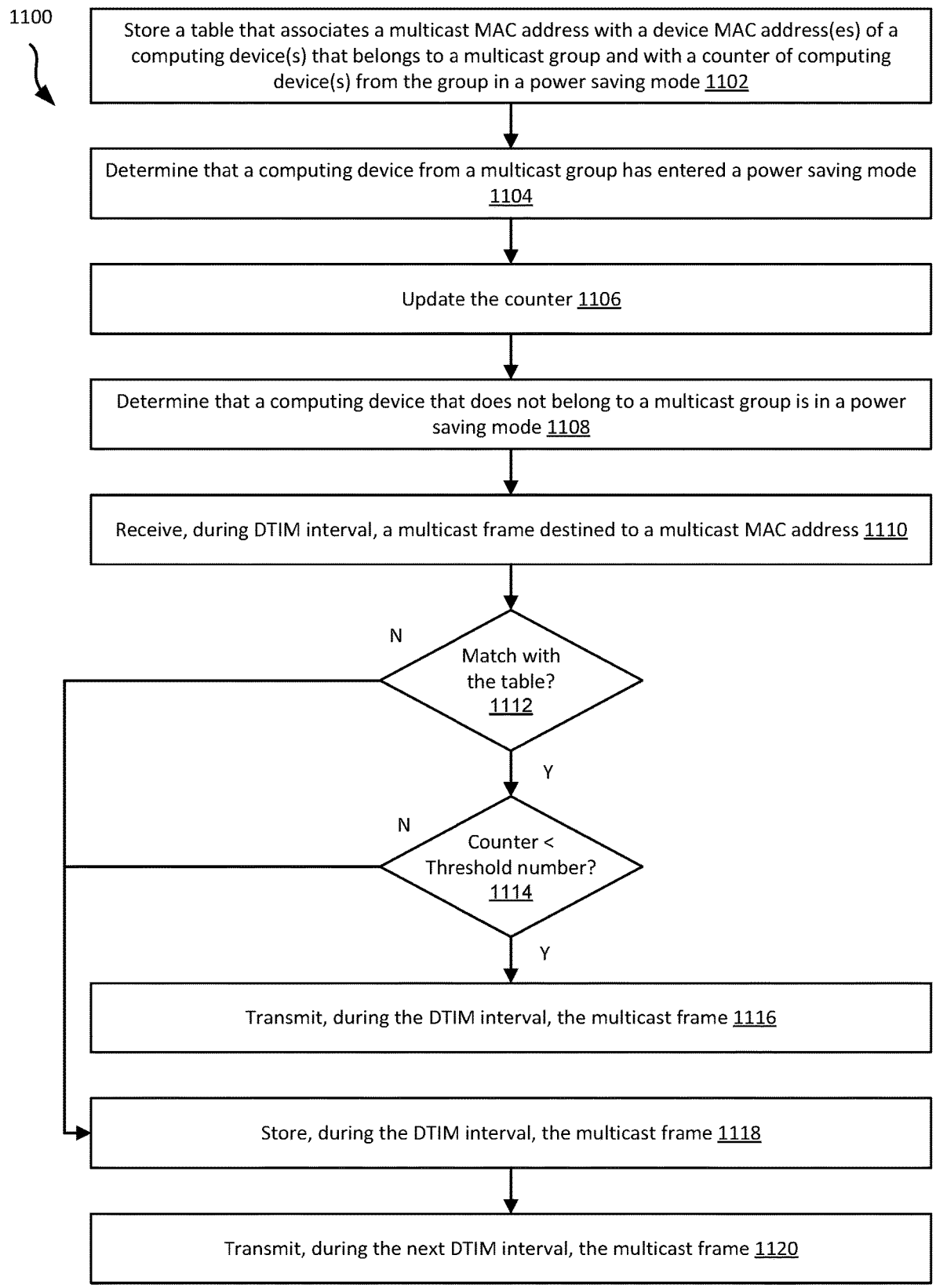
FIG. 11 illustrates an example flow of an access point managing transmission of multicast frames according to an embodiment of the present disclosure.

FIGS. 9-11 illustrate example flows for implementing an unbuffered multicast delivery mode. Devices that form a BSS, including a computing device and an access point, are described as performing operations of the flows. Instructions for performing the operations can be stored as computer-readable instructions on non-transitory computer-readable media of the devices. As stored, the instructions represent programmable modules that include code executable by a processors of the devices. The execution of such instructions configures the devices to perform the specific operations shown in the figures and described herein. Each programmable module in combination with the respective processor represents a means for performing a respective operation(s). While the operations are illustrated in a particular order, it should be understood that no particular order is necessary and that one or more operations may be omitted, skipped, and/or reordered.

FIG. 9 illustrates an example flow 900 of the computing device requesting the unbuffered multicast delivery mode according to an embodiment of the present disclosure. The flow 900 includes operations that can implement sequence steps of the sequence diagram 600 of FIG. 6.

In an example, the flow 900 starts at operation 902, where the computing devices receives a beacon frame (or another type of frames as explained herein above) from the access point. If the access point supports the capability of the unbuffered multicast delivery mode, the beacon frame can indicate this capability in a vendor element. Otherwise, no such indication is present in the beacon frame.

At operation 904, the computing device determines whether the capability of the unbuffered multicast delivery mode is supported by the access point. For example, the computing device parses the vendor element in the beacon frame to determine whether a first field in the vendor element indicates the capability and whether a second field in the vendor element indicates a threshold number for triggering the capability. If the indication is found in the first field and, optionally, the threshold number is found in the second field, the computing device determines that the access point supports the capability. In this case, operation 906 follows operation 904. Otherwise, the computing device determines that the access point does not support the capability and operation 908 follows operation 904.

At operation 906, the computing device sends, to the access point, data requesting the capability. For example, the computing device sends an action frame (or another type of frames as explained herein above) indicating a request to bind a multicast MAC address with a device MAC address, where the multicast MAC address corresponds to a multicast group, and where the device MAC address is unique to the computing device. The payload of the action frame can include the multicast MAC address, whereas the MAC header of the action frame can include the device MAC address.

At operation 908, the computing device receives, from the access point, a multicast frame. In an example, the multicast frame is sent immediately from the access point according to the unbuffered multicast delivery mode. This can be the case when another computing device that does not belong to any multicast group is in a power saving mode and/or when another computing device in the multicast group is a power saving mode but the total number of such devices in the multicast group is less than the threshold number.

At operation 910, the computing device sends, to the access point, data indicating that it has entered a power saving mode. In an example, the data is sent in a frame, where a power management bit is set to one in a frame control. The power management bit causes the access point to increment a counter for the multicast group, where the counter tracks the total number of computing devices in the group that are in a power saving mode. Conversely, the computing device can send data to the access point indicated that the computing device has exited the power saving mode. This data causes the access point to decrement the counter.

At operation 912, the computing device receives, from the access point, a multicast frame. In an example, the multicast frame is sent immediately from the access point according to the unbuffered multicast delivery mode. This can be the case when the counter indicates that the total number is less than the threshold number. In another example, the multicast frame is buffered and sent by the access point after a DTIM interval. This can be the case when the counter indicates that the total number is equal to or greater than the threshold number.

FIG. 10 illustrates an example flow 1000 of the access point generating and updating unbuffered multicast delivery data according to an embodiment of the present disclosure. The flow 1000 includes operations that can implement sequence steps of the sequence diagram 600 of FIG. 6.

In an example, the flow 1000 starts at operation 1002, where the access point transmits a beacon frame (or another type of frames as explained herein above) indicating the capability of the unbuffered multicast delivery mode. For instance, the beacon frame is broadcasted and includes vendor element. A first field in the vendor element indicates the capability and a second field of the vendor element indicates the threshold number.

At operation 1004, the access point received, from the computing device, a vendor action frame (or another type of frames as explained herein above) requesting an association between the multicast MAC address and the device MAC address.

At operation 1006, the access point generates a table that stores information that represents the association. In an example, the table represents unbuffered multicast delivery data. The table includes multiple rows (or sets of entries). Each row corresponds to a multicast group and includes a multicast MAC address, and device MAC addresses of computing devices in the multicast group (which can be a group of one computing device), and a counter.

At operation 1008, the access point receives, from the computing device, a frame indicating data about a power saving mode of the computing device, where the frame can be a data frame or a management frame. In an example, the data indicates that the computing device has entered the power saving mode. In this case, the frame includes a power management bit that to one in a frame control within the MAC header of the frame. In another example, the data indicates that the computing device has exited the power saving mode. In this case, the frame includes a power management bit set to zero in a frame control.

At operation 1010, the access point updates the table based on the frame received from the computing device. In an example, the access point determines a match between the device MAC address of the computing device and the table and identifies the associated counter. If the power management bit is set to one, the access point increments the counter by one. Otherwise, the access point decrements the counter by one.

FIG. 11 illustrates an example 1100 flow of the access point managing transmission of multicast frames according to an embodiment of the present disclosure. The flow 1100 includes operations that can implement sequence steps of any of the sequence diagrams 600-800 of FIGS. 6-8.

In an example, the flow 1100 starts at operation 1102, where the access point stores the table. In an example, the table is generated by the access point as described in connection with FIG. 10 or in connection with FIG. 6 or FIG. 8. In another example, the table is generated by a backend system and is received from the backend system and stored by the access point.

At operation 1104, the access point determines that a first computing device from a multicast group has entered a power saving mode. In an example, this determination is made in response to a frame received from the first computing device indicating that the first computing device has entered the power saving mode. The access point can respond to the first computing device with a frame acknowledging the power saving mode entry.

At operation 1106, the access point updates a counter in the table. In an example, the access point determines a match between the device MAC address of the second computing device and the table and identifies the associated counter. In particular, the access point uses the device MAC address from the MAC header of the frame received at operation 1104 to look-up the table and find an entry in the table that includes this device MAC address. The table associates this entry with another entry that maintains a value for the counter. The access point increments the value of the counter by one.

At operation 1108, the access point determines that a second computing device that does not belong to a multicast group has entered a power saving mode. In an example, this determination is made in response to a frame received from the second computing device indicating that the second computing device has entered the power saving mode. The access point can respond to the second computing device with a frame acknowledging the power saving mode entry. Here, no match exists between the device MAC address of the second computing device and the table. Therefore, the access point does not update any counter in the table.

At operation 1110, the access point receives, during a DTIM interval, a multicast frame destined to a multicast MAC address. In an example, the MAC header of the multicast frame includes the multicast MAC address. At operation 1112, the access point determines whether a match exists between the multicast MAC address and the table. For example, the access point determines the multicast MAC address from the MAC header and uses the multicast MAC address to look-up the table to determine whether this multicast MAC address is included in the table. If included, the match exists. Otherwise, no match exists. If the match exists, the access point determines that the multicast frame should be transmitted to a multicast group that has registered for the unbuffered multicast delivery mode. In this case, operation 1114 follows operation 1112. If no match exists, the access point determines that the multicast frame should be transmitted to one or more computing devices that do not belong to a multicast group that has registered for the unbuffered multicast delivery mode. In this case, operation 1118 follows operation 1112.

At operation 1114, the access point determines whether the counter associated with the multicast group is less than the threshold number. For example, the match indicates a row (or a set of entries) in the table that includes an entry storing a value for the counter. The value of the counter is compared to the threshold. If value is less than the threshold number, the access point determines that the multicast frame should be transmitted immediately to the multicast group. In this case, operation 1116 follows operation 1114. Otherwise, the access point determines that the multicast frame should be buffered and its transmission should be scheduling for the next DTIM interval. In this case, operation 1118 follows operation 1114.

At operation 1116, the access point transmits, during the DTIM interval, the multicast frame. For example, the access point transmits, during the DTIM interval, copies of the multicast frame to the computing devices that belong to the multicast group.

At operation 1118, the access point stores (e.g., buffers), during the DTIM interval, the multicast frame. Doing so delays the transmission of the multicast frame to the relevant computing device(s).

At operation 1120, the access point transmits, during the next DTIM interval, the multicast frame. For example, the access point transmits copies of the multicast frame to the relevant computing devices during the next DTIM interval.

Figure 12:
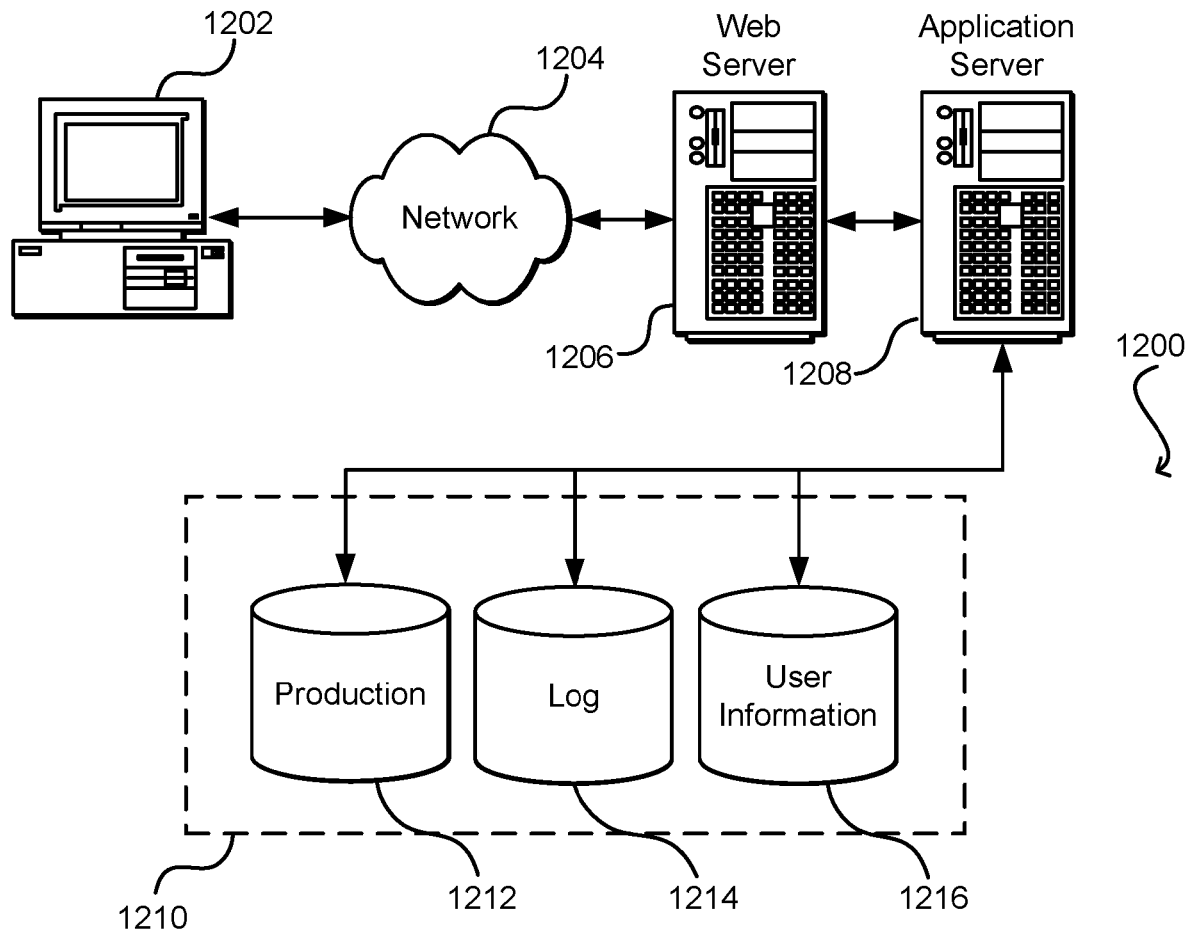
FIG. 12 illustrates a diagram showing an example of computer architecture according to an embodiment of the present disclosure.

FIG. 12 illustrates a diagram showing an example computer architecture according to an embodiment of the present disclosure. This architecture may be used to implement some or all of the systems described herein. The computer architecture shown in FIG. 12 illustrates a server computer, workstation, desktop computer, laptop, tablet, network appliance, personal digital assistant ("PDA"), e-reader, digital cellular phone, or other computing device, and may be utilized to execute any aspects of the software components presented herein.

The computer 1200 includes a baseboard 1202, or "motherboard," which is a printed circuit board to which a multitude of components or devices may be connected by way of a system bus or other electrical communication paths. In one illustrative embodiment, one or more central processing units ("CPUs") 1204 operate in conjunction with a chipset 1206. The CPUs 1204 may be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 may provide an interface to a random access memory ("RAM") 1208, used as the main memory in the computer 1200. The chipset 1206 may further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM may also store other software components necessary for the operation of the computer 1200 in accordance with the embodiments described herein.

The computer 1200 may operate in a networked environment using logical connections to remote computing devices and computer systems through a network, such as the local area network 1220. The chipset 1206 may include functionality for providing network connectivity through a NIC 1212, such as a gigabit Ethernet adapter. The NIC 1212 is capable of connecting the computer 1200 to other computing devices over the network 1220. It should be appreciated that multiple NICs 1212 may be present in the computer 1200, connecting the computer to other types of networks and remote computer systems.

The computer 1200 may be connected to a mass storage device 1218 that provides non-volatile storage for the computer. The mass storage device 1218 may store system programs, application programs, other program modules, and data, which have been described in greater detail herein. The mass storage device 1218 may be connected to the computer 1200 through a storage controller 1214 connected to the chipset 1206. The mass storage device 1218 may consist of one or more physical storage units. The storage controller 1214 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 may store data on the mass storage device 1218 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1218 is characterized as primary or secondary storage, and the like.

For example, the computer 1200 may store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 may further read information from the mass storage device 1218 by detecting the physical states or characteristics of one or more particular locations within the physical storage units.

In addition to the mass storage device 1218 described above, the computer 1200 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1200.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1218 may store an operating system 1230 utilized to control the operation of the computer 1200. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1218 may store other system or application programs and data utilized by the computer 1200. The mass storage device 1218 might also store other programs and data not specifically identified herein.

In one embodiment, the mass storage device 1218 or other computer-readable storage media is encoded with computer-executable instructions which, when loaded into the computer 1200, transforms the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various routines described above. The computer 1200 might also include computer-readable storage media for performing any of the other computer-implemented operations described herein.

The computer 1200 may also include one or more input/output controllers 1216 for receiving and processing input from a number of input devices, such as a keyboard, a mouse, a touchpad, a touch screen, an electronic stylus, or other type of input device. Similarly, the input/output controller 1216 may provide output to a display, such as a computer monitor, a flat-panel display, a digital projector, a printer, a plotter, or other type of output device. It will be appreciated that the computer 1200 may not include all of the components shown in FIG. 12, may include other components that are not explicitly shown in FIG. 12, or may utilize an architecture completely different than that shown in FIG. 12. It should also be appreciated that many computers, such as the computer 1200, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method implemented by a wireless access point, the method comprising:

transmitting a beacon frame indicating that the wireless access point supports an unbuffered multicast delivery mode, wherein the unbuffered multicast delivery mode represents a capability of transmitting a multicast frame within a same delivery traffic indication map (DTIM) interval during which the multicast frame is received by the wireless access point;

receiving, from a first computing device based on the beacon frame, a vendor action frame that includes a MAC header and an internet group management protocol (IGMP) payload, the MAC header including a device MAC address of the first computing device, the IGMP payload including a first multicast media access control (MAC) address;

storing, in a table, information that represents an association between the first multicast MAC address and the device MAC address;

receiving, from a second computing device, a data frame indicating that the second computing device is in a power saving mode, the second computing device associated with a second multicast MAC address;

receiving, in a first DTIM interval, a first multicast frame and a second multicast frame;

determining that the first multicast frame includes the first multicast MAC address;

determining that the table includes the first multicast MAC address;

transmitting, within the first DTIM interval, the first multicast frame to the first computing device;

determining that the second multicast frame includes the second multicast MAC address;

determining that the table does not include the second multicast MAC address;

storing, in memory of the wireless access point, the second multicast frame; and transmitting, within a second DTIM interval after the first DTIM interval, the second multicast frame to the second computing device.

2. The method of claim 1, wherein the first computing device is part of a group of computing devices, wherein the table associates the group of computing devices with the first multicast MAC address, the method further comprising:

storing, in the table, a value that indicates a first number of computing devices, from among the group of computing devices, that are in the power saving mode.

3. The method of claim 2, wherein the beacon frame further indicates a predefined threshold number associated with using the unbuffered multicast delivery mode for the group of computing devices, the method further comprising, prior to sending the first multicast frame to the first computing device:

determining that the value is smaller than the predefined threshold number.

4. A network access device comprising:
one or more processors; and
one or more non-transitory computer-readable storage media storing computer-readable instructions that, upon execution by the one or more processors, configure the network access device to:
  determine that a first computing device is in a power saving mode, wherein the first computing device is communicatively coupled to the network access device;
  receive, during a first delivery traffic indication map (DTIM) interval and while the first computing device is in the power saving mode, a multicast frame that includes a multicast media access control (MAC) address;
  determine that the multicast MAC address is associated with a second computing device, the second computing device being capable of multicast frame transmission during DTIM intervals; and
  send, during the first DTIM interval and while the first computing device is in the power saving mode, the multicast frame to the second computing device.

5. The network access device of claim 4, wherein the one or more non-transitory computer-readable storage media store additional computer-readable instructions that, upon execution by the one or more processors, further configure the network access device to:
  store, in a table, information indicating that the second computing device is capable of multicast frame transmission during DTIM intervals;
  receive, during the first DTIM interval, a second multicast frame;
  determine that the first computing device is a destination of the second multicast frame;
  determine that the table does not identify the first computing device;
  store the second multicast frame; and
  transmit the second multicast frame during a second DTIM interval after the first DTIM interval.

6. The network access device of claim 4, wherein the one or more non-transitory computer-readable storage media store additional computer-readable instructions that, upon execution by the one or more processors, further configure the network access device to:
  receive, from the second computing device, data indicating a request to associate the multicast MAC address with the second computing device;
  store information in a table, the information including the multicast MAC address and an identifier of the second computing device; and
  determine that the table includes the multicast MAC address.

7. The network access device of claim 4, wherein the one or more non-transitory computer-readable storage media store additional computer-readable instructions that, upon execution by the one or more processors, further configure the network access device to:
  receive, from a computer system, data that represents an association between the multicast MAC address and the second computing device; and
  determine that the data includes the multicast MAC address.

8. The network access device of claim 4, wherein the one or more non-transitory computer-readable storage media store additional computer-readable instructions that, upon execution by the one or more processors, further configure the network access device to:
  determine, from internet group management protocol (IGMP) packets sent by the network access device to the second computing device, that the second computing device is associated with the multicast MAC address;
  store information in a table representing an association between the multicast MAC address and the second computing device; and
  determine that the table includes the multicast MAC address.

9. The network access device of claim 4, wherein the one or more non-transitory computer-readable storage media store additional computer-readable instructions that, upon execution by the one or more processors, further configure the network access device to:
  determine a first number of computing devices that are associated with the multicast MAC address and that are in a power saving mode; and
  compare the first number to a predefined threshold number, wherein the multicast frame is sent based on an outcome of the comparing.

10. The network access device of claim 9, wherein the one or more non-transitory computer-readable storage media store further computer-readable instructions that, upon execution by the one or more processors, additionally configure the network access device to:
  send, to the first computing device and the second computing device, the predefined threshold number; and
  store the first number as a value of a counter of devices that are communicatively coupled with the network access device and that are in the power saving mode.

11. The network access device of claim 10, wherein the one or more non-transitory computer-readable storage media store further computer-readable instructions that, upon execution by the one or more processors, additionally configure the network access device to:
  determine, in a subsequent DTIM interval, that an additional computing device that is associated with the multicast MAC address is in the power saving mode;
  increase the value of the counter;
  receive, during the subsequent DTIM interval, an additional multicast frame that includes the multicast MAC address;
  determine that the value, as increased, exceeds the predefined threshold number; and
  store, during the subsequent DTIM interval, the additional multicast frame.

12. The network access device of claim 4, wherein the one or more non-transitory computer-readable storage media store additional computer-readable instructions that, upon execution by the one or more processors, further configure the network access device to:
  send data indicating that the network access device supports an unbuffered multicast delivery mode that a capability of transmitting the multicast frame within the DTIM interval.

13. The network access device of claim 12, wherein the data is sent in a beacon frame or a probe response frame and includes a vendor element, wherein the vendor element includes a first field that indicates the unbuffered multicast delivery mode, and wherein the vendor element includes a second field that indicates a predefined threshold number associated with using the unbuffered multicast delivery mode.

14. The network access device of claim 4, wherein the one or more non-transitory computer-readable storage media store additional computer-readable instructions that, upon execution by the one or more processors, further configure the network access device to:

receive, from the second computing device, data indicating a request to associate the multicast MAC address with the second computing device, wherein the data is received in at least one of: a vendor action frame, a probe request frame, or an association request frame.

15. A computer system comprising:
one or more processors; and
one or more non-transitory computer-readable storage media storing computer-readable instructions that, upon execution by the one or more processors, configure the computer system to:
  determine that a first computing device is in a power saving mode;
  receive, during a delivery traffic indication map (DTIM) interval and while the first computing device is in the power saving mode, a multicast frame that includes a multicast media access control (MAC) address;
  determine that the multicast MAC address is associated with a second computing device, the second computing device being capable of multicast frame transmission during DTIM intervals; and
  send, during the DTIM interval and while the first computing device is in the power saving mode, the multicast frame to the second computing device.

16. The computer system of claim 15, wherein the one or more non-transitory computer-readable storage media store additional computer-readable instructions that, upon execution by the one or more processors, further configure the computer system to:
  store a table that associates the multicast MAC address with a device MAC address of the second computing device; and
  determine that the table includes the multicast MAC address.

17. The computer system of claim 16, wherein the second computing device is part of a group of computing devices, wherein the table further associates the multicast MAC address with a first number of computing devices from among a group of computing devices that are in a power saving mode, and wherein the multicast frame is sent based on the first number.

18. The computer system of claim 15, wherein the second computing device is part of a first group of first computing devices that are associated with the multicast MAC address and of a second group of second computing devices that are associated with a second multicast MAC address, wherein the one or more non-transitory computer-readable storage media store additional computer-readable instructions that, upon execution by the one or more processors, further configure the computer system to:
  store a table that associates the multicast MAC address with the first group and with a first total number of computing devices from among the first group that are in a power saving mode, wherein the table also associates the second multicast MAC address with the second group and with a second total number of computing devices from among the second group that are in the power saving mode.

19. The computer system of claim 18, wherein the one or more non-transitory computer-readable storage media store further first computer-readable instructions that, upon execution by the one or more processors, additionally configure the computer system to:
  determine that the first total number is less than a threshold number; and
  send, during the DTIM interval, the multicast frame to the first group of first computing devices.

20. The computer system of claim 19, wherein the one or more non-transitory computer-readable storage media store further second computer-readable instructions that, upon execution by the one or more processors, additionally configure the computer system to:
  receive, during the DTIM interval, a second multicast frame that includes the second multicast MAC address;
  determine that the second total number is greater than the threshold number; and
  store the second multicast frame during the DTIM interval.

* * * * *